US011985972B2

(12) United States Patent
Engel

(10) Patent No.: US 11,985,972 B2
(45) Date of Patent: May 21, 2024

(54) BIOCIDAL

(71) Applicant: Allen Howard Engel, Auburn, WA (US)

(72) Inventor: Allen Howard Engel, Auburn, WA (US)

( * ) Notice: Subject to any disclaimer, the term of this patent is extended or adjusted under 35 U.S.C. 154(b) by 0 days.

(21) Appl. No.: 17/696,822

(22) Filed: Mar. 17, 2022

(65) Prior Publication Data

US 2023/0292749 A1    Sep. 21, 2023

(51) Int. Cl.
| | | |
|---|---|---|
| *A01N 25/34* | (2006.01) | |
| *A01N 25/10* | (2006.01) | |
| *A01N 59/00* | (2006.01) | |
| *A01N 59/14* | (2006.01) | |
| *A01N 59/16* | (2006.01) | |
| *A01N 59/20* | (2006.01) | |
| *A01N 59/24* | (2006.01) | |
| *A01P 1/00* | (2006.01) | |

(52) U.S. Cl.
CPC .............. *A01N 25/34* (2013.01); *A01N 25/10* (2013.01); *A01N 59/00* (2013.01); *A01N 59/14* (2013.01); *A01N 59/16* (2013.01); *A01N 59/20* (2013.01); *A01N 59/24* (2013.01); *A01P 1/00* (2021.08)

(58) Field of Classification Search
CPC ........ A01N 25/34; A01N 59/00; A01N 59/14; A01N 59/16; A01N 59/20; A01P 1/00
See application file for complete search history.

(56) References Cited

U.S. PATENT DOCUMENTS 10,825,911 B1 * 11/2020 Engel ................... H01L 29/24

FOREIGN PATENT DOCUMENTS

| DE | 1995020878 | 8/1995 | | |
|---|---|---|---|---|
| DE | 1999047253 | 9/1999 | | |
| DE | 1066825 | 1/2001 | | |
| DE | 10210667 | 9/2003 | | |
| DE | 102005044360 | 3/2007 | | |
| DE | 2008128827 | 10/2008 | | |
| DE | 102008031310 | 1/2010 | | |
| DE | 102017121439 | 3/2019 | | |
| DE | 3907261 | 11/2021 | | |
| EP | 2009051817 | 4/2009 | | |
| EP | 2018085376 | 5/2018 | | |
| EP | 3436233 B1 * | 2/2020 | ........... | B29C 59/022 |
| ES | 3436233 | 2/2020 | | |
| GB | 2015091261 | 6/2015 | | |
| IT | 2014207655 | 12/2014 | | |
| PT | 107263 | 4/2019 | | |
| WO | WO 2011044580 | 4/2011 | | |

OTHER PUBLICATIONS

Santosh Pandit, Karolina Gaska, V. R. S. S. Mokkapati, Sven Forsberg, Magnus Svensson, Roland Kadar and Ivan Mijakovic, "Antibacterial effect of boron nitride flakes with controlled orientation in polymer composites", RSC Advances, 2019, 9, 33454-33459. (Year: 2019).*

Xiao-Ning Yang, Dong-Dong Xue, Jia-Ying Li, Miao Liu, Shi-Ru Jia, Li-Qiang Chu, Fazli Wahid, Yu-Ming Zhang and Cheng Zhong, "Improvement of antimicrobial activity of graphene oxide/bacterial cellulose nanocomposites through the electrostatic modification", Carbohydrate Polymers 136 (2016) 1152-1160. (Year: 2016).*

Xinglin Lu, Xunda Feng, Jay R. Werber, Chiheng Chu, Ines Zucker, Jae-Hong Kim, Chinedum O. Osuji,and Menachem Elimelech, "Enhanced antibacterial activity through the controlled alignment of graphene oxide nanosheets", PNAS, 2017, E9793-E9801. (Year: 2017).*

Chengyun Zhou et al., "Semiconductor/boron nitride composites: Synthesis, properties, and photocatalysis applications", Applied Catalysis B: Environmental, 238, 2018, 6-18. (Year: 2018).*

Valerio Magnasco, "A model for the van der Waals bond", Chemical Physics Letters, 387 (2004), 332-338. (Year: 2004).*

François Perreault, Marissa E. Tousley, and Menachem Elimelech, "Thin-Film Composite Polyamide Membranes Functionalized with Biocidal Graphene Oxide Nanosheets", Environmental Science & Technology Letters, 2014, 1, 71-76. (Year: 2014).*

Hsin-Cheng Hsu et al. "Graphene oxide as a promising photocatalyst for CO2 to methanol conversion", Nanoscale, 2013, 5, 262-268. (Year: 2013).*

Omid Akhavan and Elham Ghaderi, "Toxicity of Graphene and Graphene Oxide Nanowalls Against Bacteria", ACSNano, 2010, 4(10), 5731-5736. (Year: 2010).*

Voiry, Damien, etal. Enhanced catalytic activity in strained chemically exfoliated WS$_2$ nanosheets for hydrogen evolution, Nat Mater. Sep. 2013;12(9):850-5.

Palmieri, Valentina etal. The future development of bacteria fighting medical devices: the role of graphene oxide Expert Rev Med Devices. Nov. 2016;13(11):1013-1019.

Wei, Wei etal. Distinct antibacterial activity of vertically aligned graphene coating against Gram-positive and Gram-negative bacteria, J. Mater. Chem. B, 2020,8, 6069-6079.

Roy, S. etal. Mechanistic Insight into the Antibacterial Activity of Chitosan Exfoliated MoS2 Nanosheets: Membrane . . . Stress,Appl. Bio Mater. 2019, 2, 7, 2738-2755, May 2019.

Zaman, Sojib Bin, A Review on Antibiotic Resistance: Alarm Bells are Ringing., Cureus, Article,Jun. 28, 2017, p. 2 9(6).

(Continued)

*Primary Examiner* — Mina Haghighatian
*Assistant Examiner* — Nathan W Schlientz

(57) ABSTRACT

Biocidal coatings include flake shaped particles that are deposed with a vertical orientation to form a coating which is biocidal to pathogens including viruses, bacteria, biofilms, fungi, microbes, algae, and other pathogens. In some embodiments, the pathogen membrane becomes lacerated when contacting the blade shaped flake particle. In other embodiments, a flake shaped particle which is a semiconductor generates radicals, or hydroxyls, or oxidizers, which transit to pathogens, and stress or deactivate the pathogens. In still more embodiments, this generation of radicals, hydroxyls, or oxidizers by the semiconductive flake shaped particle is increased with light irradiation.

13 Claims, 9 Drawing Sheets

(56) References Cited

OTHER PUBLICATIONS

Banin, Ehud, Editorial: Bacterial pathogens, antibiotics and antibiotic resistance, Article, Federation of European Microbiological Reviews, May 2017, p. 450 41(3).

Hall, Clayton W.etal.,,Molecular mechanisms of biofilm-based antibiotic resistance and tolerance . . . Fed. of European Microbiological Society Reviews, May 2017, p. 276 41(3).

Yang, Qiu E.etal., Toxin-antitoxin systems and their role in disseminating and maintaining . . . Federation of European Microbiological Societies Reviews, p. 350, May 2017,41(3).

Mazel, D.etal., Antibiotic resistance in microbes. Article, Cellular and Molecular Life Sciences, p. 752 Nov. 30, 1999,56.

Hyde, Josephine, Antibiotic resistant bacteria and commensal fungi are common and conserved . . . , Plos One, Journal, p. 1.Aug. 14, 2019.

Arias, L.Menendez, Molecular basis of human immunodeficiency virus drug resistance: an update, Antiviral Research, Journal,2010, p. 93 85(1).

YC, Jiang, New strategies against drug resistance to herpes simplex virus. International Journal of Oral Science 2016, p. 1, Mar. 30;8.

Gaudieri, S.etal., Hepatitis C virus drug resistance and immune-driven adaptations: relevance to new antiviral therapy. Hepatology, 2009,p. 107049(4).

Niimi, M.etal., Antifungal drug resistance of oral fungi. Odontology, p. 17, Feb. 2010,98.

Berman, Judith, Drug resistance and tolerance in fungi. Nature Reviews in Microbiology, Feb. 2020,18, p. 321.

Kim, In Tae, Chemically exfoliated 1T-phase transition metal dichalcogenide nanosheets for transparent antibacterial applications, 2D Materials, Feb. 28, 2019,p. 4, 6(2).

Basu, Parbati, Defect-Engineered MoS2 Nanostructures for Reactive Oxygen Species Generation in the . . . , Applied Material Interfaces, Dec. 26, 2019, p. 48181,11, (51).

Wang, Longwei, Defect-Rich Adhesive Molybdenum Disulfide/rGO Vertical Heterostructures with Enhanced Nanozyme . . . , Advanced Materials, Oct. 28, 2020, p. 2005423.

Alimohammadi, Farbod, Antimicrobial Properties of 2D MnO2 and MoS2 Nanomaterials Vertically Aligned on Graphene Materials . . . , Langmuir, Article, May 21, 2018, 34, p. 7192, (24).

Islam, MD Ashraful, Noble metal-coated MoS2 nanofilms with vertically-aligned 2D layers for visible light-driven . . . , Scientific Reports, Nov. 2, 2017, p. 1.

Kiani, Fatemeh, Effect of graphene oxide nanosheets on visible light-assisted antibacterial activity of . . . , Journal of Colloid Interfaces, Jul. 2018, p. 120.

Pandit, Santosh, Antibacterial effect of boron nitride flakes with controlled orientation . . . , RSC Advances, Paper, Oct. 17, 2019,57, p. 33454.

Pandit, Santosh, Vertically Aligned Graphene Coating is Bactericidal and Prevents . . . , Advanced Materials Interfaces, Apr. 9, 2018,5(7), p. 1701331.

Wei, Wei, Distinct antibacterial activity of a vertically aligned graphene coating against . . . , Journal of Materials Chemistry B, Journal, Jun. 4, 2020,28, p. 6069.

Arce, A Sussarey, Bacterial viability on chemically modified silicon . . . , Journal of Materials Chemistry B, Journal, Mar. 7, 2016,18, p. 3104.

Yu, Ho Jung, Vertical Heterostructure of Two-Dimensional MoS2 and WSe2 with Vertically Aligned Layers, Nano Letters, 2015, 15(2), p. 1031.

Zhao, Yingcan, The antibacterial activities of MoS2 nanosheets towards multi-drug resistant bacteria, Chem. Communications, Feb. 9, 2021,24, p. 2998.

Yang, Xi, Antibacterial activity of two-dimensional MoS2 sheets, Nanoscale, Paper, Jun. 19, 2014,6, p. 10126.

Liu, Conghui, An open source and reduce expenditure ROS generation strategy for chemodynamic/photodynamic . . . , Nature Communications,2020,11, p. 1.

TAn, Xianjun, Reinventing MoS2 Co-catalytic Fenton reaction: Oxygenincorporation mediating surface superoxide . . . , Nano Research Article,2021,15(3), p. 1973.

Sarniak, Agata, Endogenous mechanisms of reactive oxygen species (ROS) generation, Postepy Hig Med Dosw, Nov. 14, 2016,70(0), p. 1150.

Liu, Yuanbin, Generation of reactive oxygen species by the mitochondrial electron transport chain, Neurochem, Mar. 2002;80(5), p. 780.

Fu, Peter P, Mechanisms of nanotoxicity: generation of reactive oxygen species, Food Drug Analysis, Review, Mar. 2014;22(1), p. 64.

Dulkeith, E.et al., Fluorescence Quenching of Dye Molecules near Gold Nanoparticles . . . , Physics Review Letters, Oct. 2002,89, p. 203002.

Scharff, Peter, Therapeutic Reactive Oxygen Generation, Tumori, Mar. 2008,94(2), Journal, p. 278.

Sarkar, Depanjan, Holey MoS2 Nanosheets with Photocatalytic Metal Rich Edges by Ambient Electrospray . . . , Global Challenges, Article, Sep. 2018,2(12), p. 1800052.

Morones, Jose Ruben, The bactericidal effect of silver nanoparticles, Nanotechnology, Oct. 2005;16(10), p. 2346.

Hu, Wenbing, Graphene-Based Antibacterial Paper, ACS Nano, Article,2010,4(7), p. 4317.

Xiao, Shufeng, Graphene oxide as antibacterial sensitizer: Mechanically disturbed cell membrane . . . , Carbon, Journal,2019,149, p. 248.

Mutalik, Chinmaya, Phase-Dependent MoS2Nanoflowers for Light-Driven Antibacteria . . . , ACS Sustainable Chemistry and Engineering, Jun. 2021,9(23), p. 7904.

Hu, Xiaoyi, Nano-layer based 1T-rich MoS2/g-C3N4 co-catalyst system for enhanced photocatalytic . . . , Applied Catalysis B: Environmental, Jul. 5, 2020, p. 118466.

Han, Dongchen, Synergistic engineering of MoS2 via dual-metal doping strategy towards hydrogen evolution reaction, Applied Surface Science, Nov. 1, 2020,529, p. 147117.

Ji, Liang, One-pot synthesis of porous 1T-phase MoS2 integrated with single-atom Cu doping . . . , Applied Catalysis B: Environmental, p. 87.

Wei, Jie, Conversion of 2H MOS2 to 1 T MoS2 via lithium ion doping: Effective removal of elemental mercury, Chemical Engineering Journal, Jan. 15, 2022,428, p. 131014.

Gan, Xiaorong,2H/1T Phase Transition of Multilayer MoS2 by Electrochemical Incorporation of S Vacancies, ACS Applied Energy Materials,2018,1(9), p. 4754.

Unat, Mehmet Altay,2D MXenes with antiviral and immunomodulatory properties: A pilot study against SARS-CoV-2, Nanotoday, Jun. 2021,38, p. 101136.

Galante, Anthony J.etal., Coal-Derived Functionalized Nano-Graphene Oxide for Bleach Washable, Durable Antiviral Fabric Coatings, ACS Applied Nano Materials, Jan. 3, 2022,5(1), 718.

Khatami, Mehrdad, MXenes for antimicrobial and antiviral applications: recent advances, Advanced Performance Materials, 11, Nov. 2021, p. 2002587.

Mitrzak, Joanna, Engineering of 2D Ti3C2 MXene Surface Charge and its Influence on Biological Properties, Materials,2020, 13(10), p. 1.

Shansabadi, Ahmad Arabi, Antimicrobial Mode-of-Action of Colloidal Ti3C2Tx MXene Nanosheets, ACS Sustainable Chemistry & Engineering,2018,6(12), p. 16586.

Malina, Tomas, Toxicity of graphene oxide against algae and cyanobacteria: Nanoblade-morphology-induced mechanical injury and self-protection mechanism, Carbon, Dec. 2019, p. 386.

Tang, Kaiwei, Molybdenum disulfide (MoS2) nanosheets vertically coated on titanium for disinfection in the dark, Arabian Journal of Chemistry, Jan. 2020,13, p. 1612.

Begum, Salma, Antimicrobial Peptide-Conjugated MoS2-Based Nanoplatform for Multimodal Synergistic Inactivation of Superbugs, ACS Applied Bio Materials, 2019, 2(2), p. 769.

Roy, Shounak, Mechanistic Insight into the Antibacterial Activity of Chitosan Exfoliated MoS2 Nanosheets: Membrane Damage . . . , ACS Applied Bio Materials, May 22, 2019,p. 2738.

Yang, Xue,2D graphene and h-BN layers application in protective coatings, Corrosion Reviews, Feb. 11, 2021, p. 93.

(56) References Cited

OTHER PUBLICATIONS

Mazinani,Arash,Comparative antibacterial activity of 2D materials coated on porous-titania,Journal of Materials Chemistry B,2021,9, p. 6412.
Liu,Yiming,Antibacterial graphene oxide coatings on polymer substrate,Applied Surface Science, Apr. 1, 2018,436, p. 624.
Rai,Mahendra,Metal nanoparticles: The protective nanoshield against virus infection,Crit Rev Microbiol,2016,42(1), p. 46.
Hao,Nanjing,Shape control of mesoporous silica nanomaterials templated with dual cationic surfactants and their antibacterial activities,Biomaterials Science,2016,4, p. 87.
Xu,Min,Opening Magnesium Storage Capability of Two-Dimensional MXene by Intercalation of Cationic Surfactant,ACS Nano,2018,12(4), p. 3733.
Galoppini,Elena,Linkers for anchoring sensitizers to semiconductor nanoparticles,Coordination Chemistry Reviews,Jul. 2004,248(13-14), p. 1283.
Camilli,L.etal.,Growth of two-dimensional materials on non-catalytic substrates: h-BN/Au(111),2D Materials,Aug. 27, 2014, p. 1.
Wojciechowski,Tomasz,Non-toxic 2D TiC MXene surface-modified with Al, Ga, In alkoxides by chemical reactions metal trialkyls,Nano-Structures & Nano-Objects, Feb. 2022, p. 100820.
Fonseca,Carmen,Poly(lactic acid)/$TiO_2$ nanocomposites as alternative biocidal . . . , Materials Science and Engineering: C, Dec. 1, 2015,57, p. 314.
Perkas,Nina,Biocidal properties of $TiO2$ powder modified with Ag nanoparticles,Journal of Materials Chemistry B,2013,1(39), p. 5309.
Pandit,Subhendu,High Antibacterial Activity of Functionalized Chemically Exfoliated MoS2,ACS Applied Materials & Interfaces,2016,8(46), p. 31567.
Bhattacharyya et al. Effect of strain on electronic and thermoelectric properties of few layers to bulk MoS2 Nanotechnology, vol. 25, No. 46, p. 465701.
Pandit, S. etal. Vertically Aligned Graphene Coating is Bactericidal and Prevents the Formation of Bacterial Biofilms, Advanced Material Interfaces, 5, 7Apr. 9, p. 1701331.
Tu, Destructive extraction of phospholipids from *Escherichia coli* membranes by graphene nanosheets, Nature Nanotechnology, Jul. 7, 2013, 594-601.
Liu, Antibacterial Activity of Graphite, Graphite Oxide, Graphene Oxide, and Reduced Graphene Oxide: Membrane and Oxidative Stress, ACS Nano, vol. 5, No. 9, 6971-6980.
Shoja, et al., Preparation, Characterization and Antibacterial Properties of Polycaprolactone/ZnO Microc., D. Journ. of Nanomaterials and Biostructures vol. 10, No. 1, p. 169.
Huang et al., Hybrid quantum dot tin disulfide field effect transistors with improved photocurrent and spectral responsivity, Appl. Phys. Lett. 108, 123502 (2016).
Boulesbaa et al., Ultrafast Charge Transfer and Hybrid Exciton Formation in 2D/0D Heterostructures, J. Am. Chem. Soc. 2016, 138, 44, 14713.
Oliveira et al., The Use of Zinc Oxide Nanoparticles in Eva to Obtain Food Packing Films, Advances in Nanoparticles, 2020, 9, 59-.
Kang et al., Facile Preparation and Photocatalytic Activity of $TiO2$ Microspheres with a Diameter of 1-8 μm, Advanced Materials Research Online, vols. 881-883, p. 990-.
Pandit et al., Supporting Information: High Antibacterial Activity of Functionalized Chemically Exfoliated MoS2, ACS Appl. Mater. Interfaces 2016, 8, 46, 31567.
ASTM D907-15, Standard Terminology of Adhesives, ASTM.
Galante, et al. Coal-Derived Functionalized Nano-Graphene Oxide for Bleach Washable, Durable Antiviral Fabric Coatings, Applied Nano Materials, Pg. A, Dec. 13, 2021.
Nara et al., Electrical and Optical Properties of Poly(vinyl chloride)/ZnS Nanocomposites Exposed to Gamma Radiation, Materials Research. Mar. 19, 2023.
Ganguly et al., Construction of zinc selenide microspheres decorated with octadecylamine-functionalized reduced graphene oxide . . . Materials Today Chemistry Apr. 5, 2022.
Liu et al., Ultrasonication-Triggered Ubiquitous Assembly of Magnetic Janus Amphiphilic Nanoparticles in Cancer Theranostic Applications,Nano Lett. 2019, 19, 6, 4118.

* cited by examiner

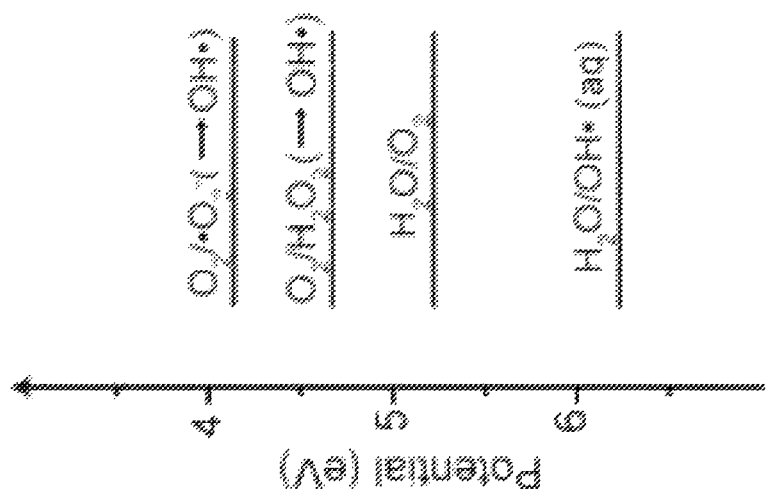

BIOCIDAL

PRIOR ART

Some pathogens continue to develop resistance to some prior art antibiotics. Sojib Bin Zaman et al. in their review described that antibiotic resistance occurs when a drug loses its ability to inhibit bacterial growth effectively. Bacteria become 'resistant' and continue to multiply in the presence of therapeutic levels of the antibiotics. Bacteria, which replicate even in the presence of the antibiotics, are called resistant bacteria [1].

According to Banin etal., one of the modes by which bacteria exert antimicrobial resistance is through their ability to form biofilms. Biofilms are surface-attached bacteria encased in a self-produced extracellular polymeric matrix. The biofilm increases the pathogen resistance to a wide range of stressors including antimicrobials, disinfectants and antibiotics. The mechanisms underlying this resistance are complex [2].

Hall and Mah provide insights into these resistance mechanisms, which include the interaction of antibiotics with matrix components, reduced growth rates and a range of genetic determinants that specifically mediate resistance in the biofilm mode of growth. Notably, it is usually not one single mechanism that provides antimicrobial resistance, but rather a combination of several of these resistance mechanisms that manifests the extremely high resistance observed within biofilm cells [3].

Yang and Walsh in their review discuss the variety of different toxin-antitoxin (TA) systems that are currently known, and their role as drivers in the maintenance of antimicrobial resistance in pathogen populations. They also discuss how TA systems are often associated with antimicrobial genes present on the same plasmid as the toxin-antitoxin itself, and how that coincidence can act to maintain the antimicrobial resistance genes even in the absence of the drug. In addition, they highlight how the mutagenic SOS system, which is induced by many commonly used antimicrobial drugs, activates some TA systems, placing a continuing selective pressure on certain TA systems to be mobilized throughout bacterial populations [4].

Mazel etal. teach a few common scenarios of microbes multi-drug resistance development:

1) A single plasmid or transposon encodes resistance to several different antibiotics; e.g., clusters.

2) A single gene encodes a biochemical mechanism that engenders resistance to a class of related antibiotics; e.g., erm triggers resistance to the macrolides; aac, aph, ant to the aminoglycosides, and bla to the b-lactams.

3) A single resistance gene encodes resistance to a group of structurally unrelated antibiotics, e.g., aad determines resistance to both streptomycin and spectinomycin, or various non-specific efflux systems.

4) A non-antibiotic, such as a disinfectant or organic salt (e.g., mercury), selects for the establishment of genetically linked antibiotic resistance genes.

5) Mutations occur in multiple, independent target genes (as in M. Tuberculosis) [5].

Hyde etal. characterized the antibiotic resistant bacterial populations from colony-reared *Aedes aegypti* larvae and adults and two field caught mosquito species *Coquillettidia perturbans* and *Ochlerotatus canadensis*. The cultured bacterial populations were dominated by isolates belonging to the class Gammaproteobacteria. Among the antibiotic resistant populations, they found bacteria resistant to carbenicillin, kanamycin, and tetracycline, including bacteria resistant to a cocktail of all three antibiotics in combination. Isolates were characterized by 16S rRNA gene sequencing, and clustering into Operational Taxonomic Units (OTUs; 99% sequence identity). 27 antibiotic resistant OTUs were identified, although members of an OTU did not always share the same resistance profile. This suggests the clustering was either not sensitive enough to distinguish different bacteria taxa or different antibiotic resistant sub-populations exist within an OTU. Finally, the antibiotic selection opened up a niche to culture mosquito-associated fungi, and 10 fungal OTUs (28S rRNA gene sequencing) were identified. Two fungal OTUs both classified to the class Microbotryomycetes were commonly identified in the field-caught mosquitoes [6].

Menéndez-Arias reported that viral resistance is caused by mutations in the HIV genome coding for structural changes in the target proteins that can affect the binding or activity of the antiretroviral drugs. Their review provided an overview of the molecular mechanisms involved in the acquisition of resistance to currently used and promising investigational drugs, emphasizing the structural role of drug resistance mutations [7].

Jiang etal. reported about the resistance mechanisms of herpes simplex virus (HSV) to Acyclovir (ACV): (a) decreased production of viral TK, (b) complete deficiency in viral TK activity, and (c) viral TK protein and DNA polymerase with altered substrate specify. The viral mutations conferring resistance to ACV are located in activating/phosphorylating genes (TK, UL23 kinase) and the viral DNA pol enzyme (UL30), consistently with the above mechanisms of action. The viral mutations in the TK gene generally result in incomplete or deficient enzymes because of the addition or deletion of nucleotides in long homopolymeric runs of Gs and Cs. Approximately 95% of ACV-resistant HSV clinical isolates have a TK-deficient phenotype. The target of anti-HSV drugs is primarily the DNA pol gene of HSV. A single mutation in DNA pol enzyme may confer resistance to many anti-HSV agents [8].

Gaudieri etal. have shown that the efficacy of specifically targeted anti-viral therapy for hepatitis C virus (HCV) (STAT-C), including HCV protease and polymerase inhibitors, is limited by the presence of drug-specific viral resistance mutations within the targeted proteins. Genetic diversity within these viral proteins also evolves under selective pressures provided by host human leukocyte antigen (HLA)-restricted immune responses, which may therefore influence STAT-C treatment response. The frequency of the variations varied according to individual STAT-C drug and HCV genotype/subtype. Of individuals infected with subtype 1a, 21.5% exhibited genetic variation at a known drug resistance site. Furthermore, they identified areas in HCV protease and polymerase that are under both potential HLA-driven pressure and therapy selection and identified six HLA-associated polymorphisms (P≤0.05) at known drug resistance sites [9].

Niimi etal. have shown that the resistance of oral fungi to azoles has two components: one is the resistance of individual cells, and the other is resistance conferred by growth as a biofilm. The mechanisms of azole resistance occurring in monoculture in vitro are well understood, and high-level resistance is often caused by the expression of efflux pumps. The nature of antifungal resistance seen clinically in vivo is more complex: it is multifactorial and in part the result of growth as a biofi 1 m. Although efflux pumps may play a role in azole resistance early in biofilm development, interactions with other microorganisms, the biofi 1 m extracellular matrix, and the response of the fungi to stress all contribute to the drug resistance of biofilms [10].

Berman etal. reported about antifungal heteroresistance of *Cryptococcus neoformans* and *Cryptococcus gattii*, and is an intrinsic property of these species. Extra copies of an individual chromosome are associated with cryptococcal heteroresistant isolates; the degree to which heteroresistance is due to a particular aneuploidy seems to be strain-specific. In Cryptococus, one molecular mechanism of heteroresistance seems to involve extra copies of the chromosome carrying both ERG11, the target of azoles, and AFR1, a major efflux pump. However, some *Cryptococcus* heteroresistant isolates do not have obvious aneuploidies. *C. glabrata* isolates exhibit a range of heteroresistance levels and highly heteroresistant isolates exhibit increased levels of efflux activity; however, the molecular mechanisms that yield heteroresistance in *C. glabrata* and in non-aneuploid *Cryptococcus* isolates are not known. Very few studies have analyzed the role of heteroresistance in in vivo persistence of a fungal pathogen in animal tissues after antifungal treatment [12].

In some prior art, the biocidal coatings are not permanent, and become exhausted within weeks of initial use. Silver nanoparticles, copper nanoparticles, and others which are not bound to the coating, can shed from the coating. In some prior art the biocidal coating becomes less active with time due to chemical degradation. And in some prior art, the biocidal becomes completely inert with time.

In other prior art, the biocidal is most effective when the biocidal is conductive. However, the conductivity of some prior art biocidals can become reduced over time. In prior art biocidals containing $MoS_2$ flakes, the flakes are active biocidals when the flakes are electrically conductive, with the conductive IT chemical structure, but their effectiveness is reduced as the $MoS_2$ flake inevitably converts from the IT structure to the 2H structure, that is, converts from being conductive to becoming semiconductive.

Kim etal. have shown the antibacterial activities of 1T-phase $MoS_2$, $WS_2$, and $MoSe_2$ flakes. The flakes were investigated by a microbial viability test using *E. coli* DH5α as model bacteria. Their study shows the loss of *E. coli* viability after 3 h incubation with TMD nanosheets where the loss of viability is calculated from the equation: loss of viability (%)=(counts of control−counts of samples incubated with TMD nanosheets)/counts of control×100%. *E. coli* cells incubated under identical conditions in the absence of TMD nanosheets were used as a control sample. The obtained results revealed that IT-phase $WS_2$ nanosheets inactivated the bacterial viability the most where the loss of *E. coli* viability incubated with 1T-phase $WS_2$ (0.05 mg ml−1) is approximately 72.4%, with that of $MoS_2$ being higher than that of MoSe2 [13].

Basu et al. introduce that defects on varied $MoS_2$ surfaces by suitable doping of nitrogen atoms in a sulfur-rich reaction environment, resulting in stable and scalable phase conversion from 2H to 1T. The experimental characterizations along with the theoretical calculations within the framework of density functional theory establish the impact of nitrogen doping on stabilization of defects and reconstruction of the 2H to 1T phase. The as-synthesized $MoS_2$ samples exhibit excellent dye removal capacity in the dark, facilitated by a synergistic effect of reactive oxygen species (ROS) generation and adsorption. Positron annihilation spectroscopy and electron paramagnetic resonance studies substantiate the role of defects and associated sulfur vacancies toward ROS generation in the dark. Further, on the basis of its ample ROS generation in the dark and in the light, the commendable antimicrobial activity of the prepared $MoS_2$ samples against fungal pathogen *Alternaria alternata* has been demonstrated [14].

Yu summarizes the generation of Reactive Oxygen Species (R.O.S):. "When a semiconductor photocatalyst is bombarded with photons, which have more energy than its and-gap energy, the electrons on the photocatalyst surface are excited and jump from the valence band (VB) to the conduction band (CB). At the same time, positively charged holes are created in the VB.20, 21 The redox potentials of these photogenerated electrons and holes are determined by the band-edge positions of the semiconductor photocatalyst. In general, the smaller (or larger) the potential of the CB (or VB), the stronger the reductive (or oxidative) capacity of the photogenerated electrons (or holes). Those photogenerated electrons with enough reductive power can react with oxygen molecules to form $O_2·$-radicals, which serve as precursors to the generation of ·OH and singlet oxygen ($1O_2$), whereas the photogenerated holes with enough oxidative power can react with water or hydroxide ions to form ·OH·22 $MoS_2$ is a semiconducting material, and electron transfer can be induced under external stimuli, such as visible-light illumination, causing the electron-hole (e--h+) pairs. 1T ACTION When the thickness of $MoS_2$ is reduced to one or a few layers, the physicochemical properties of $MoS_2$ become very different from those of bulk $MoS_2$ due to the confinement of charge carriers in $MoS_2$'s basal plane directions. Bulk $MoS_2$ exhibits an indirect band gap of 1.3 eV, whereas the monolayer $MoS_2$ shows a direct band gap of 1.9 eV with a significant enhancement of light absorption efficiency.23-25 This leads $MoS_2$ to be widely explored in photocatalysis.26 in terms of the ROS formation potential, the band positions of monolayer $MoS_2$, few-layer vertically aligned (FLV) $MoS_2$, bulk $MoS_2$, and two common photocatalysts ($TiO_2$ and g-C3N4) are compared in FIG. 3A. All of these materials can generate various ROS through photocatalysis, but $MoS_2$ allows most of the solar spectrum to be harvested due to its smaller band gap. Compared with bulk $MoS_2$, the band-edge positions of mono- or few-layer $MoS_2$ are shifted such that the redox potentials favor the generation of ROS. [78].

Wang etal. have reported about facile synthesis of a defect-rich adhesive molybdenum disulfide ($MoS_2$/rGO vertical heterostructure (VHS) through a one-step microwave-assisted hydrothermal method is reported. This method for rapid material synthesis enables extremely uniform and well-dispersed $MoS_2$/rGO VHS with abundant S and Mo vacancies and rough surfaces. They demonstrated experimentally and theoretically that the as-prepared $MoS_2$/rGO VHS possesses defect and irradiation dual-enhanced triple enzyme-like activities (oxidase, peroxidase, and catalase) for promoting free-radical generation, owing to much more active edge sites exposure. Meanwhile, the VHS-achieved rough surface exhibits excellent capacity for bacterial capture, with elevated reactive oxygen species (ROS) destruction through local topological interactions. As a result, optimized efficacy against drug-resistant Gram-negative and Gram-positive bacteria can be explored by such defect-rich adhesive nanozymes [15].

Ali Mohammadi etal. have investigated the antimicrobial mode-of-action of 2D nanomaterials. The viability measurements of the bacteria species (i.e., *B. subtilis* as a Gram+ and *E. coli* as a Gram-classes) treated with the vertically aligned and randomly oriented $MnO_2$ and $MoS_2$ flakes confirm that the sharp edges of the flakes play a significant role in damaging the bacterial cell wall and reducing membrane integrity. Although $MnO_2$ and $MoS_2$ flakes show different antibacterial activities against the bacteria species, in both cases, Gram+bacteria show higher loss in membrane integrity. Ali proposed that the PM in bacteria cell wall is likely the primary target of the 2D flakes, which is supported by the experimental observation that shows that 2D flakes show a higher antibacterial activity toward Gram+species. Finally, although Ali proposes PM as an important target of the 2D flakes, more studies are needed to understand the molecular-level nature of the interaction. Ali's study shows that vertically aligned 2D flakes motif show a higher antibacterial activity against both bacteria classes than 2D flakes that have been previously investigated [16].

Ashraful Islam ctal. have shown that 2D $MoS_2$ films with vertically-aligned layers exhibit numerous 2D edge sites which are predicted to offer superior chemical reactivity owing to their enriched dangling bonds. This enhanced chemical reactivity coupled with their tunable band gap energy can render the vertical 2D $MoS_2$ unique opportunities for environmental applications that go beyond the conventional applications of horizontal 2D $MoS_2$. Islam reports that $MoS_2$ films with vertically-aligned 2D layers exhibit excellent visible light responsive photocatalytic activities for efficiently degrading organic compounds in contaminated water such as harmful algal blooms [17].

Kiani etal. have shown the effect of graphene oxide (GO) flakes on the antibacterial activity of CuO nanowire arrays under visible light irradiation is shown. A combined thermal oxidation/electrophoretic deposition technique was employed to prepare three-dimensional networks of graphene oxide flakes hybridized with vertically aligned CuO nanowires. With the help of standard antibacterial assays and X-ray photoelectron spectroscopy, it is shown that the light-activated antibacterial response of the hybrid material against gram-negative *Escherichia coli* is significantly improved as the oxide functional groups of the GO flakes are reduced. In order to explore the physicochemical mechanism behind this behavior, ab-initio simulations based on density function theory were performed and the effect of surface functional groups and hybridization were elucidated. Supported by the experiments, a three-step photoantibacterial based mechanism is suggested: (i) injection of an electron from CuO into rGO, (ii) localization of the excess electron on rGO functional groups, and (iii) release of reactive oxygen species lethal to bacteria [18].

Pandit etal. have recently demonstrated that vertically aligned coatings of graphene-based nanomaterials provide strong antibacterial effects on various surfaces. Here we investigated whether BN, a nanomaterial with extensive similarities to graphene, might exhibit similar antibacterial properties. To test this, we developed a novel composite material using BN and low density polyethylene (LDPE) polymer. The composite was extruded under controlled melt flow conditions leading to highly structured morphology, with BN oriented in the extrusion flow direction. Nanocomposite extruded surfaces perpendicular to the flow direction were etched, thus exposing BN nanoparticles embedded in the matrix. The antimicrobial activity of extruded samples was evaluated against *Escherichia coli, Pseudomonas aeruginosa, Staphylococcus epidermidis* and *Staphylococcus aureus* by the colony forming units (CFUs) counting method. Furthermore, the bactericidal effect of oriented BN against *E. coli* and *S. aureus* was evaluated by scanning electron microscopy (SEM) and live/dead viability assay. Our results suggest that BN flakes on the extruded BN/LDPE composite physically interact with the bacterial cellular envelope, leading to irreparable physical damage. Therefore, we propose that BN-polymer composites might be useful to develop polymer based biomedical devices protected against bacterial adhesion, and thus minimize device associated infections [19].

Pandit etal. reported that graphene, a 2D carbon-based material, can be effectively used to prevent bacterial attachment. The key parameter for this effect is the orientation of graphene with respect to the coated surface. Chemical vapor deposition (CVD) graphene, deposited horizontally on the surface, exhibits no antibacterial effect. By contrast, an array of graphene flakes grown perpendicularly to the surface by a plasma-enhanced CVD (PECVD) process prevent biofilm formation. Electron microscopy reveals that the exposed edges of vertically aligned graphene flakes penetrate the bacterial membrane and drain the cytosolic content. Bacteria are not able to develop resistance to this killing mechanism during multiple exposures [20].

Wei etal. reported that graphene-based nanomaterials (GBNs) are known to exhibit biocidal activities, however, the combined effect of GBNs based on physical disruption and oxidative stress on different types of bacteria remain unclear. Here, we use both Gram-negative (*Escherichia coli* and *Salmonella typhimurium*) and Gram-positive (*Staphylococcus aureus* and *Staphylococcus epidermidis*) bacteria to investigate the antimicrobial properties of vertically and horizontally aligned graphenes grown on semiconductor silicon (Si) and insulator silicon dioxide ($SiO_2$). It is found that the bacteria show different sensitivity to isomeric-structured GNBs. Gram-negative bacteria are more vulnerable to graphene-coated Si substrates than to $SiO_2$, because the less negatively charged membrane enhances the electron transfer effect that extracts the electrons from the microbial membranes, and Gram-positive bacteria seem to show more susceptibility to physical puncturing of vertically aligned graphene than to horizontally aligned graphene due to the nature of the compound and the shape of the membrane structure [21].

Susarrey-Arce etal. have fabricated and characterized multiscale-functional nanotopographies with three levels of functionalization: (1) nanostructure topography in the form of silicon nanowires, (2) covalent chemical modification with (3-aminopropyl)triethoxysilane, and (3) incorporation of chlorhexidine digluconate. Cell viability assays were carried out on two model microorganisms *E. coli* and *S. aureus* over these nanotopographic surfaces. Using SEM we have identified two growth modes producing distinctive multicellular structures, i.e. in plane growth for *E. coli* and out of plane growth for *S. aureu* [22].

Yu etal. reported about synthesis of different from most studies of 2D materials with their atomic layers parallel to substrate, having developed layer vertically aligned 2D material nanofilms. Built on these developments, they demonstrated the synthesis of vertical heterostructure of n-type $MoS_2$ and p-type $WSe_2$ with vertically aligned atomic layers. Thin film of $MoS_2/WSe_2$ vertical structure was successfully synthesized without significant alloy formation. [24].

Yi's work is representative of many researchers art. Many researchers will develop layers of films with their atomic layers parallel to the substrate, and these researchers will describe their devices as vertically aligned, or vertically stacked, whereas in truth, the layers of atoms are horizontal in their orientation. In this application, the atomic layers are normal to the substrate or member, and the major axis of the flake is approximately normal to the substrate or member.

So from the prior art examples described above, the prior art sometimes teaches a vertically aligned dichalcogenide flake. However, it is difficult to perform these orientation techniques at scale to afford economies for mass production.

The following patents do not teach a flake shape coupled with vertical flake orientation:

U.S. Pat. No. 6,844,122, 2005, Haggquist, Gregory W.
U.S. Pat. No. 8,889,253, 2014, Kekicheff, Patrick etal.
U.S. Pat. No. 7,704,754B2, 2005, Malak, Henryk
U.S. Pat. No. 10,105,875, 2018, Young, Micheal etal.
U.S. Pat. No. 11,149,154B2, 2021, Cohen, Robert etal.
U.S. Patent 20200288707A1, 2020, Juodkazi, Saulius, etal.
U.S. Patent 20210032481, 2021, James, Joseph etal.
WO2009051817A, 2009, Zax, Adam etal.
WO2015091261A, 2015, Ryan, Darragh etal.
U.S. Patent 2013/0251948A1, 2015, Lyons, Alan Michael etal. requires corona poling to place the flakes near the surface of the member. Corona poling is a process which takes many minutes to do.

Regarding the generating of holes and electrons, there are structural means whereby the output of radicals is increased. For example, the IT structure of $MoS_2$ generates holes and electrons. In addition, strain due to compression causes $MoS_2$ shift to the IT structure, generating holes and electrons. Impurities, also known as dopants, cause flakes to generate holes and electrons. If permeants like air or water could contact the flakes buried in the coating of other particles, the additional permeants would increase the quantity of radicals generated. If heterojunctions were formed in the composite particles, the lifetime of electrons could be lengthened, allowing more electrons to be emitted to air and water to generate radicals. Prior art also teaches using silver nanoparticles and copper nanoparticles, which ultimately become chemically degraded, and no longer function.

It would be an advance in the art if the IT structure of $MoS_2$ was permanent. It would be an advance in the art if strain caused by compression caused $MoS_2$ to permanently shift to the IT structure. It would be an advance n the art if impurities improved the generation of holes and electrons. It would be an advance in the art if permeants could contact portions of the flakes buried in the coating of other particles. It would be an advance in the art if the composite particles and other particles would form heterojunctions to allow more time for the electrons and holes to emit to the ambient air or liquid solution. And it would also be an advance in the art if the composite particle had virtually unending effectiveness.

Prior art teaches small volume laboratory methods to vertically orient the flakes. Some of the prior art teaches that a vertically oriented flake has more vacancies and available molybdenum atoms to catalyze. Still other prior art teaches laboratory scale methods to vertically orient the flake so that light and oxygen and moisture is proximal to the catalytic sites of the flake. And still other prior art teaches laboratory vacuum deposition to grow vertically oriented flakes, wherein the pathogen becomes lacerated when contacting the edges of the flake. But none of the prior art methods are suitable to scale to economical mass production.

Pandit etal. teach " . . . as long as a predominantly vertical alignment of the flakes can be achieved on the surface, sufficient antibacterial effects can probably be attained with a simpler coating method." Based on Pandit's teaching, it would be an advance in the art if the composite particles could be deposited with a preferential orientation, at low cost, using mass production methods.[19]

BRIEF DESCRIPTION OF THE FIGURES

FIG. 2 shows a variety of profiles of flake-shaped particles.

FIG. 5b shows the generation of radicals by the $MoS_2$ flake available to oxygen in an open cell of the foam coating.

FIG. 11 Prior Art shows the Reactive Oxygen Species (R.O.S.) formation potential with respect to the vacuum level.

DETAILED DESCRIPTION OF THE FIGURES

Figure 1:
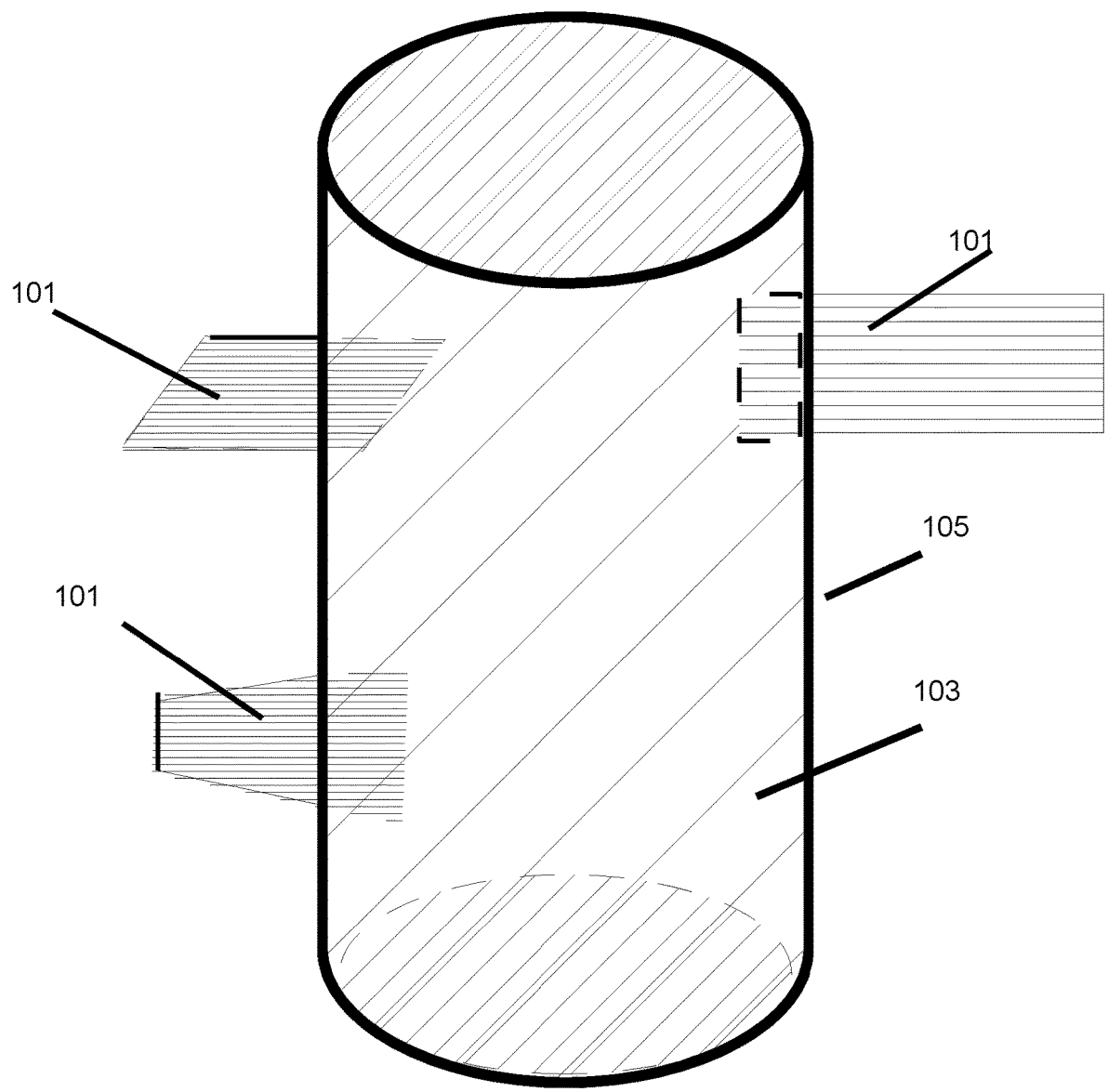
FIG. 1 shows a 25 micron diameter thermoplastic fiber. Previously, when the thermoplastic fiber was in a rubbery state above its glass transition temperature, flake-shaped particles were transited to the fiber surface and pierced the fiber surface, and a portion of each flake-shaped particle became submerged within the fiber. As the thermoplastic fiber cooled to below its glass transition temperature, and the fiber transformed to a glassy state, the submerged portion of the flake-shaped particle became locked into the fiber.

FIG. 1 shows flake-shaped particles 101 partly buried within the thermoplastic fiber 103. The flake-shaped particles 101 are oriented with their major axis approximately normal to the exterior surface 105 of the fiber 103. This FIG. 1 includes only a few exemplary flake-shaped particles 101. In some embodiments, the fiber 103 would have a multitude of flake-shaped particles 101 partly buried into the fiber 103.

Figure 2:
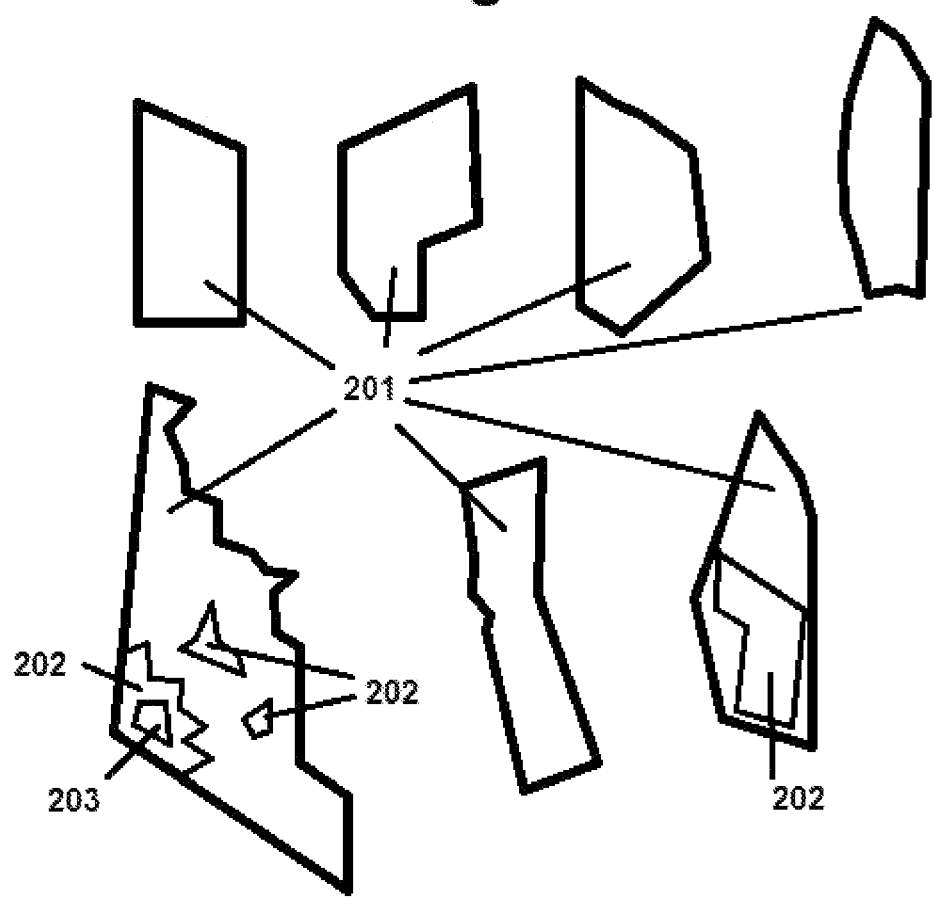
FIG. 2 shows the basal surfaces of the flakes-shaped particles.

FIG. 2 shows a variety of flake-shaped profiles, the basal side of the flake-shaped particles 201. The shape of the flake-shaped particles 201 is sundry and varied. FIG. 2 has flake-shaped particles 201 comprised of a monolayer of atoms. In the case of $MoS_2$, 201 is a single triad, comprising a layer of sulfur atoms, a layer of molybdenum atoms, and another layer of sulfur atoms. Van Der Waals forces bond flake-shaped particle 201 to layer 202, which is a second flake layer, again comprising a layer of atoms. In the case of $MoS_2$, 202 is a layer comprised of a second triad, said second triad layer comprising a layer of sulfur atoms, a layer of molybdenum atoms, and another layer of sulfur atoms. Van Der Waals forces bond layer 202 to third flake layer 203, and again third layer 203 comprises a layer of atoms. In the case of $MoS_2$, this third layer 203 is comprised of another triad, comprising a layer of sulfur atoms, a layer of molybdenum atoms, and another layer of sulfur atoms. The reader will note that some of the edge profiles of these flake-shaped particles look similar to the serrations on a knife blade. In embodiments wherein the flake-shaped particle 201 is graphene, or in other embodiments wherein the particle 201 is $MoS_2$, both have modulus strength as strong as steel or even stronger than steel.

Figure 3:
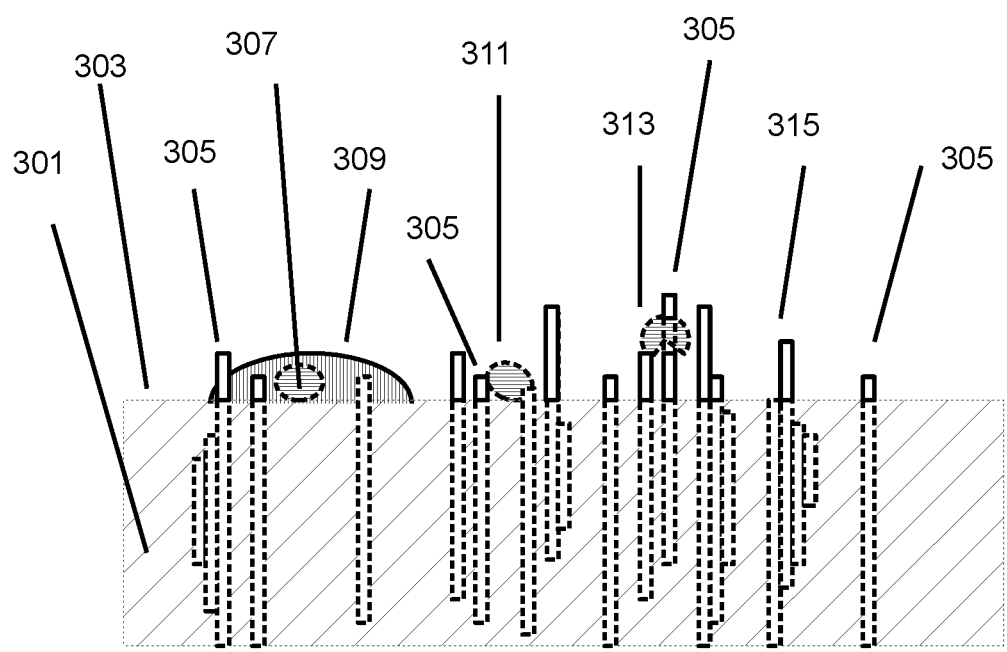
FIG. 3 is a side view of the biocidal coating, with portions of flake-shaped particles partly buried in the coating, and in some embodiments, the opposite portion of these flake-shaped particles protruding from the top surface of the coating. In some embodiments the flake-shaped particle has lacerated and penetrated the biofilm produced by the pathogen. In some embodiments the porous pathogen membrane is lacerated by the flake-shaped particles, and the pathogen is also in contact with the top surface of the ingredients comprising the biocidal coating. In other embodiments the pathogen is interrupted by the flake-shaped particle The membrane wall of the pathogens are being lacerated, and in some embodiments, other components of the pathogens are being lacerated as well.

FIG. 3. is a side view. 301 is a biocidal coating. Coating 301 has a top surface 303. 305 is a flake piercing the biofilm 309. Biofilm 309 was generated by the pathogen 307. The biofilm 309 contains pathogen 307. The pathogen 311 has a porous membrane indicated by dashed lines. The membrane of pathogen 311 is torn open by the flake-shaped particle 305.

Pathogen 311 is also in contact with the top surface 303 of coating 301. Pathogen 313 is pierced by flake-shaped particle 305. Flake-shaped particle 315 is at least a 3-4 atomic layer flake-shaped particle. Flake-shaped particles 305 and 315 are partly submerged in the biocidal coating 301. Portions of flake-shaped particles 305 and 315 protrude through the top surface 303 of the biocidal coating 301.

Figure 4:
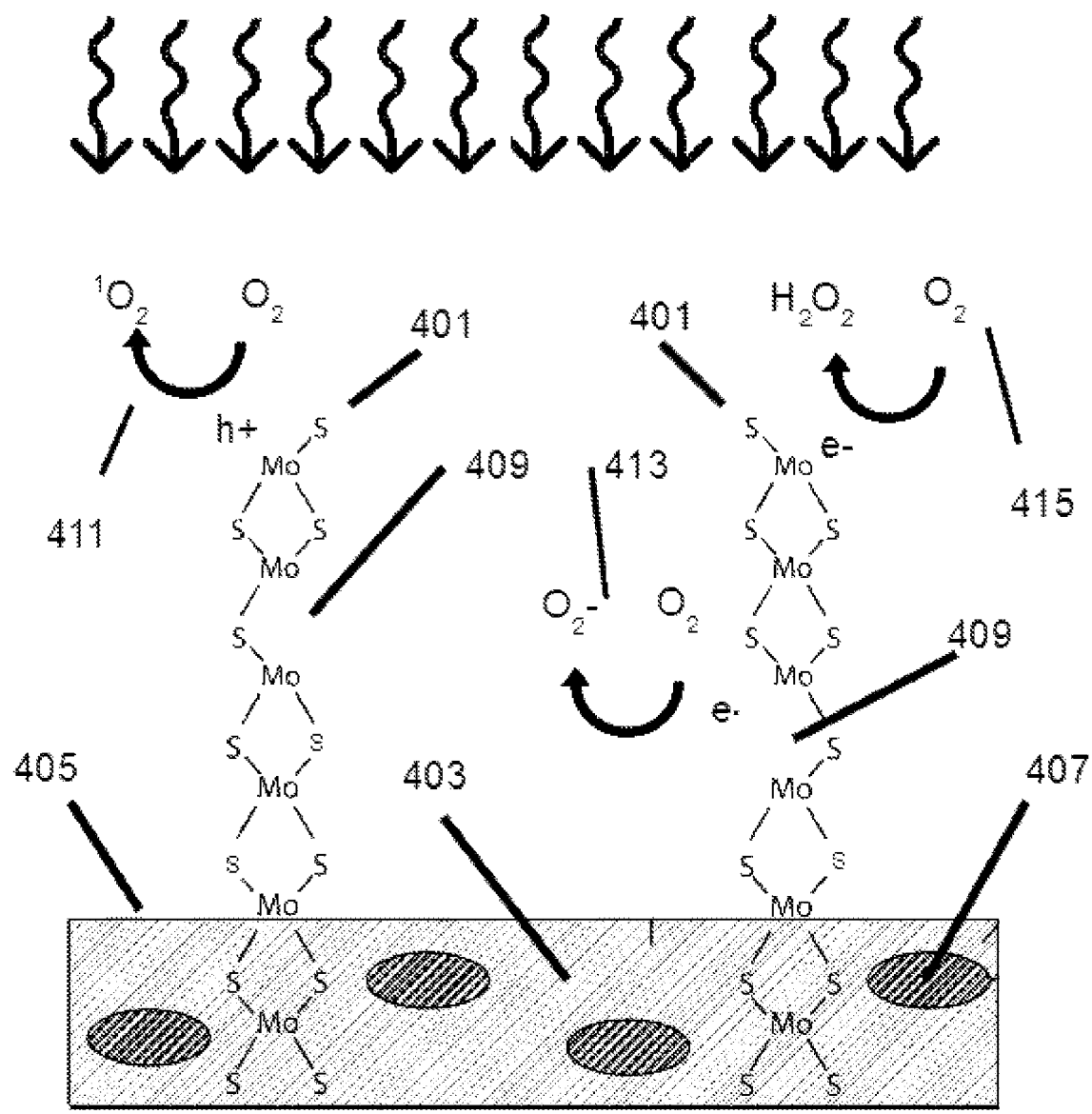
FIG. 4 shows how hydroxyls, radicals, oxidizers are generated by the photocatalyzing atoms (which in this embodiment are the molybdenum atoms) upon exposure to light radiation.

FIG. 4 has flake-shaped particles (which in this embodiment is $MoS_2$) 401 partly buried in the biocidal coating 403, and the flake-shaped particles 401 protruding through the top surface 405 of the biocidal coating 403. The coating 403 includes a variety of materials, including photoinitiators 407. Vacancies 409 enable materials such as oxygen, water vapor, and water to have redox reactions with the available molybednum atoms in this embodiment. 411, 413, 415 summarize the generation of ionic species from oxygen and water.

Figure 5A:
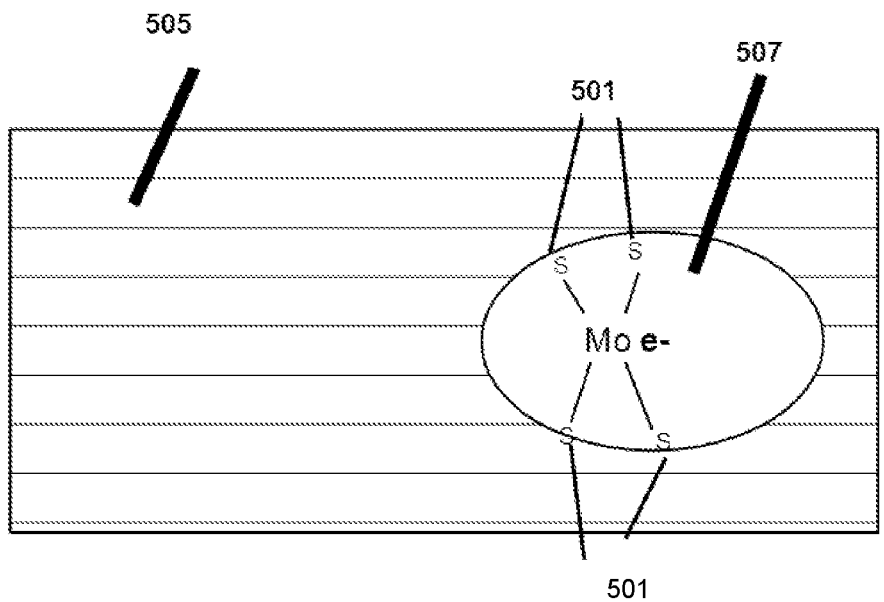
FIG. 5a and FIG. 5b are side views which shows a flake-shaped $MoS_2$ particle in a coating with foam pores.

In side view FIG. 5a, $MoS_2$ flake 50 is partly buried in biocidal coating 505. Pore former 507 is included within the biocidal coating 505.

Figure 5B:
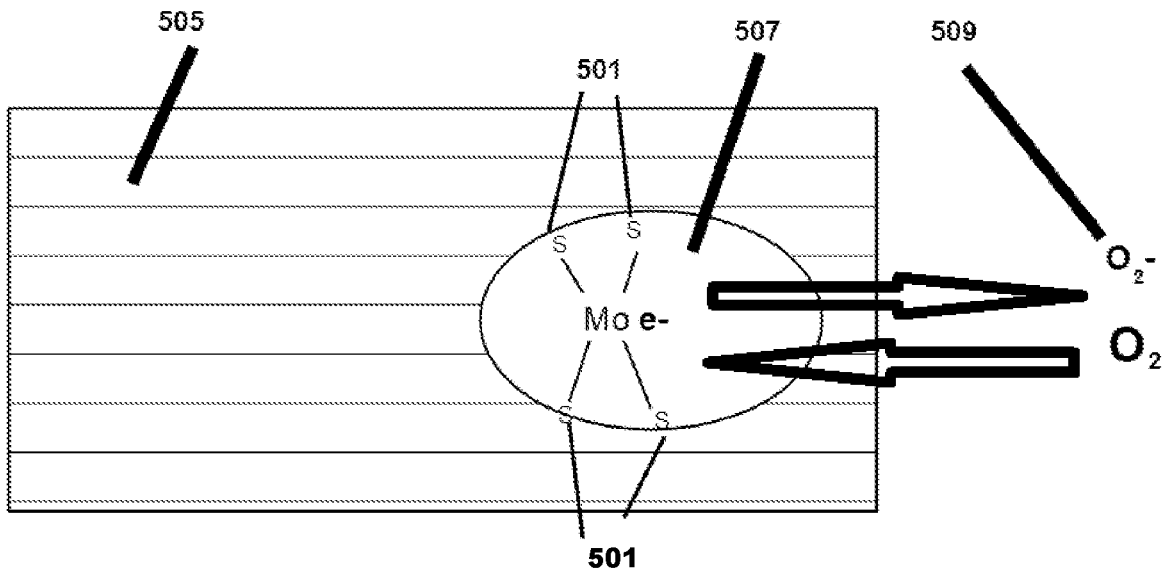

In side view FIG. 5b, heat is applied to biocidal coating 505, causing the pore former to change state and become a gas 507, which changes the morphology of biocidal coating 505 into an open cell foam morphology. The $MoS_2$ flake 501 ionic species 509.

In FIG. 6 $MoS_2$, denatures the helical shape of a protein, and deactivates the protein in a multistep process.

Figure 6A:
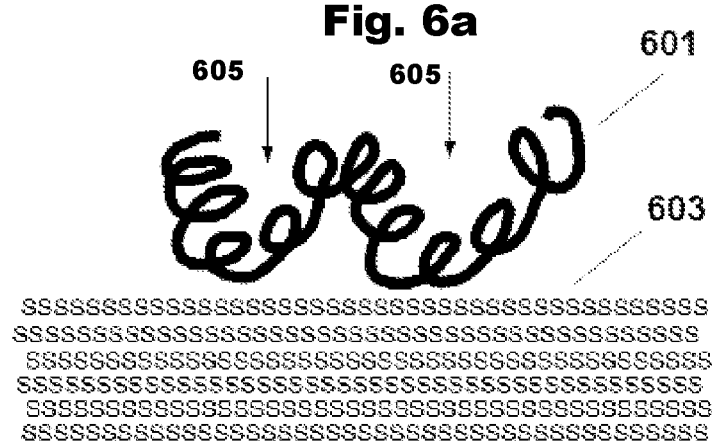
FIG. 6a, FIG. 6b, and FIG. 6c show the denaturing of a protein by a $MoS_2$ flake. The basal surface of the $MoS_2$ flake is represented by the numerous S characters symbolizing sulfur atoms.

In FIG. 6a, portions of the three dimensional helical shape protein 601 are attracted to the $MoS_2$ surface 603 by electrostatic forces.

Figure 6B:
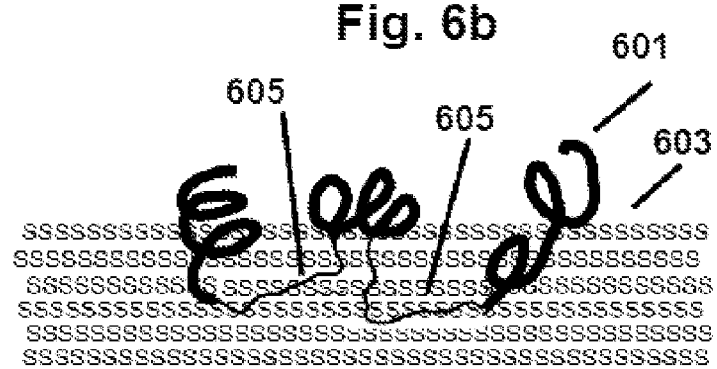

In FIG. 6b, As portions of the protein 601 anchor to the surface of the $MoS_2$ 603, they are quickly unwound, becoming adsorbed remnants 605 of the protein.

Figure 6C:
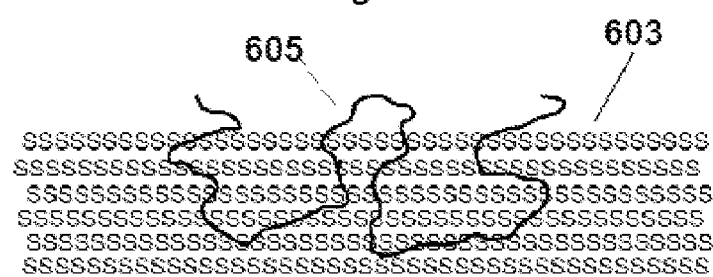

In FIG. 6c. these newly unwound remnants 605 successively make additional contacts with the $MoS_2$ 603, leading to further unwinding of nearby portions of the three dimensional protein helix 601, until most of the protein no longer has a three dimensional helical shape. Without its three dimensional helical shape the protein is now deactivated also known as denatured.

Figure 7:
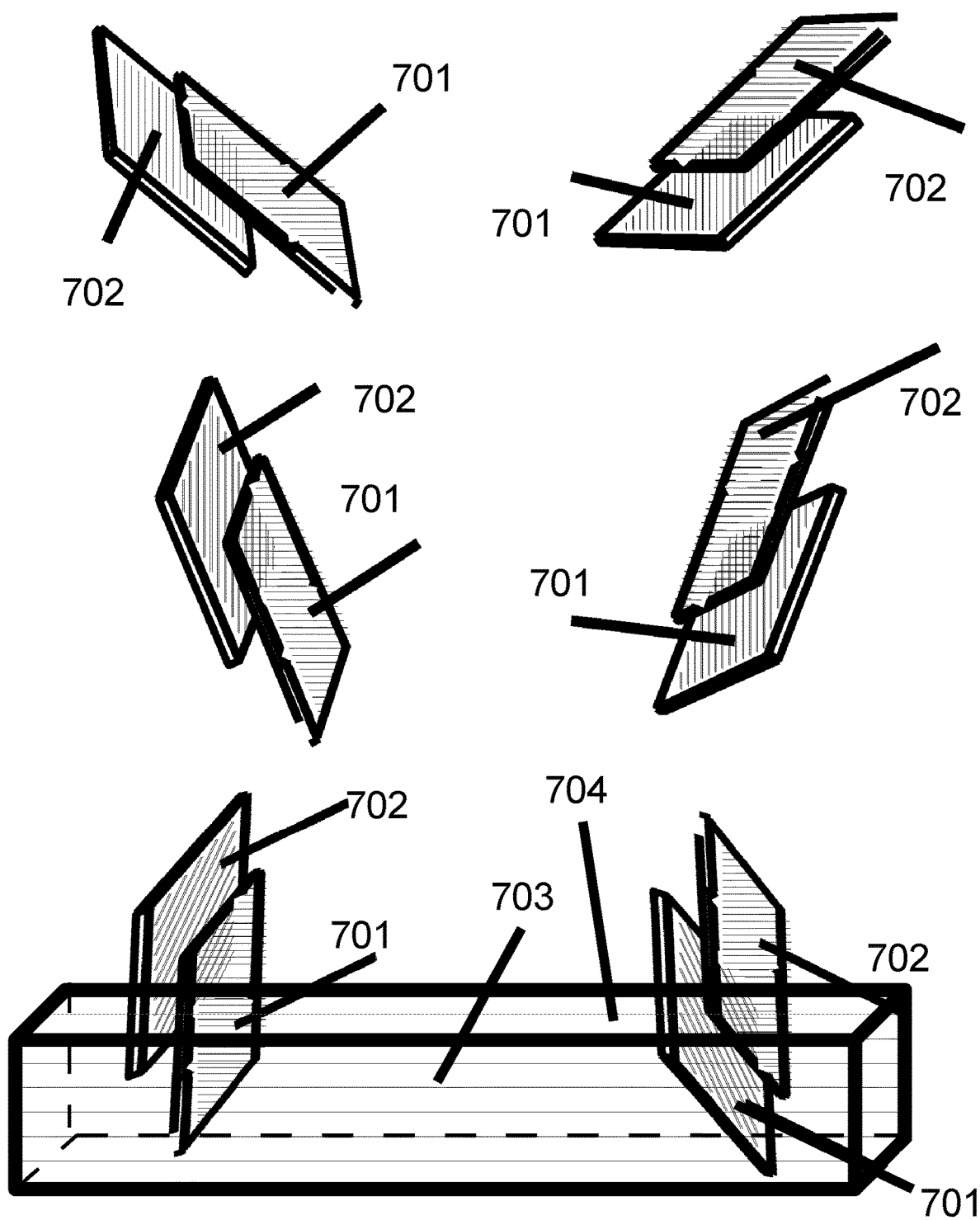
FIG. 7 shows flake-shaped particles with one potential transiting to a biocidal coating with the opposite potential. A field orients the major axis of the flake-shaped particles normal to the opposite potential. In some embodiments, the flake-shaped particles pierce the top surface of the biocidal coating, and a portion of the flake-shaped particle becomes submerged within the coating. In some embodiments only one type of flake transits. In other embodiments, 2 or more flakes transit together or separately.

FIG. 7 has a plurality of flake-shaped particles 701 and other particles 702. The flake-shaped particles 701 and other particles 702 have one potential. The flake-shaped particles 701 and other particles 702 are attracted to the opposite potential, and transit to the opposite potential. In some embodiments the flake-shaped particles 701 and other particles 702 are oriented normal to the opposite potential. In some embodiments, the flake-shaped particles 701 and other particles 702 are buried partly into biocidal coating 703, and part of the flake-shaped particles 701 and other particles 702 protrude from the top surface 704 of the biocidal coating 703.

Figure 8:
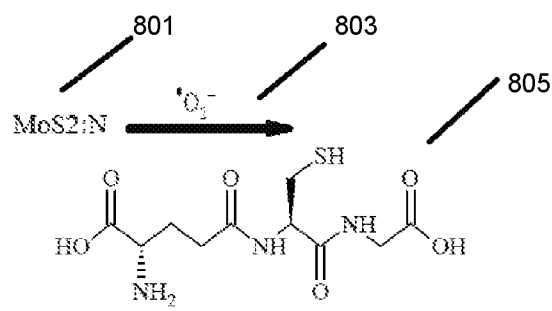
In FIG. 8 the N-doped $MoS_2$ flakes produce R.O.S. (Reactive Oxygen Species) in the absence of light. $*O_2-$ interacts with glutathione (GSH).
Figure 8:
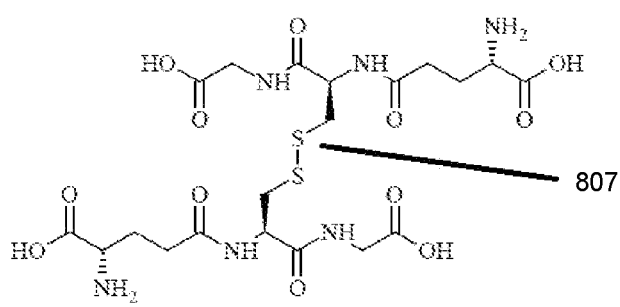

In FIG. 8. the flake-shaped particle (which includes a $MoS_2$ flake doped with N) 801 generates $*O_2$— 803. $*O2$— converts the —SH in tripeptideglutathione (GSH) 805, (GSH is a major portion of an exemplary fungal membrane.), resulting in the di-sulfide bond 807, that depresses the antioxidant function of GSH 805 of the fungi, eventually deactivating the fungal antioxidant system.

Figure 9:
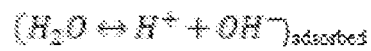
In FIG. 9, without light excitation, the flake-shaped particle generates electrons and holes, spontaneously dissociates water into H and to hydroxyl *OH, and also generates $O_2$ into $*O_2-$, hydroxyls and radicals which both stress and deactivate pathogens.
Figure 9:
Figure 9:
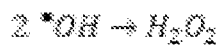
Figure 9:
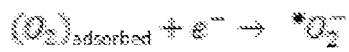
Figure 9:
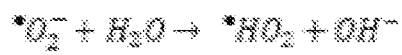
Figure 9:
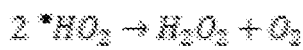

In FIG. 9, without light excitation, the flake-shaped particle generates electrons and holes, spontaneously dissociates water into H and to hydroxyl *OH and also generates $O_2$ into radical $*O_2$—, hydroxyls and radicals which both stress and deactivate pathogens.

Figure 10:
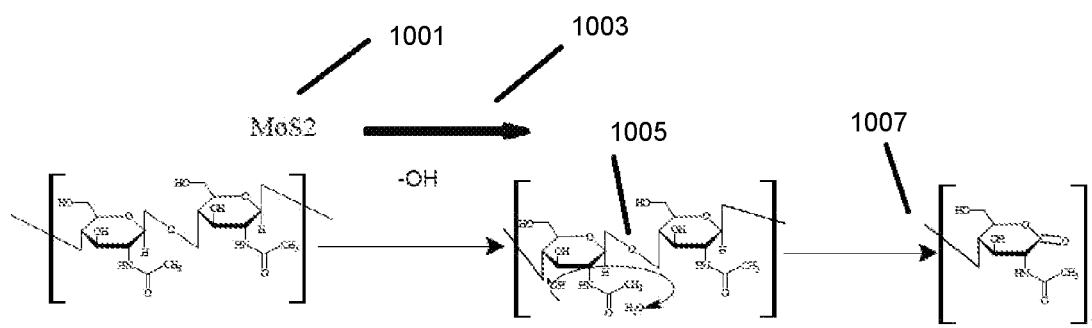
In FIG. 10 the flake-shaped particle generates *OH, without excitation by light, which ultimately forms pores in the cell membrane and allows the intracellular materials to exit through the cell membrane,
leading to the deactivation of the pathogen.

In FIG. 10 the flake-shaped particle, (including the $MoS_2$ flake), 1001, generates *OH 1003 which cleaves the glysodic linkage 1005 of the Chitin linked to B-glucan, resulting in an ester bond 1007 which forms pores in the cell membrane and allows the intracellular materials to exit through the cell membrane, also interfering with the ion exchange of the cell membrane, all these actions leading to the deactivation of the pathogen.

FIG. 11 Prior Art shows the Reactive Oxygen Species (R.O.S.) formation potential with respect to the vacuum level.

SPECIFICATION

In some embodiments, the composite biocidal particle is comprised of a flake shape particle and a linker, or a flake shape particle and other particles. The flake shape particle is oriented such that a portion of the flake protrudes into the ambient atmosphere and water vapor, or protrudes into a liquid containing water, and, in some embodiments, the linker binds the composite biocidal particle to a member surface.

In other embodiments, the composite biocidal particle is comprised of a flake shape semiconductive particle and a linker or a flake shape semiconductive particle and other particles.

In some embodiments containing $MoS_2$ semiconductive flakes, since a portion of the flake shape particle is proximal to atmosphere, air and oxygen and water vapor and water, all can be catalyzed by the available molybdenum atoms at the edges of the $MoS_2$ flake and within the voids lacking sulfur atoms, absent from the basal planes of the $MoS_2$ flake. And unlike a horizontally oriented flake which is influenced by nearby solid materials, the vertically oriented flakes and their molybdenum atoms are available to air and oxygen and water vapor and water, without dangling bonds to interfere.

The composite particle is not a vertical stack, with atomic layers parallel to the member surface. Rather the vertically aligned flakes protrude away from the other particles comprising the composite particle, protruding into the ambient surroundings. Some scientists teach a "vertical stack". A vertical stack is a composite comprised of a first flake shaped layer, with its major axis largely parallel to the substrate it adheres to. The other flake shaped layers are stacked upon the first layer, again with its major axis parallel to the substrate. This arrangement of 2D flakes does not function as well as that of a 2D flake protruding from the other components of the particle, protruding from the top surface of the coating, and protruding into the environment.

Here is a non-limiting list of 2D flakes and other materials which are suitable as flakes for the composite particle: $MoS_2$, graphene, reduced graphene, graphene oxide, black phosphorous, BCN-graphene, fluorographene, hexagonal boron nitride, white phosphorous, $WS_2$, $MoSe_2$, $WSe_2$, $MoTe_2$, $WTe_2$, $NbSe_2$, $NbS_2$, $TaS_2$, $TiS_2$, $NiSe_2$, $SnS_2$, $ZrS_2$, MnS, MnTe, ZnS, $GeS_2$, $ZrSe_2$, GeS, $GeS_2$, GaSe, GaTe, InSe, $Bi_2Se_3$, Mica, BSCCO, MoO, WO), $TiO_2$, $MnO_2$ $V_2OS$, $TaO_3$, $RuO_2$, $LaNb_2O_7$, $(Ca,Sr)_2Nb_3O_{10}$, $Bi_4TiA_2$, $Ca_2Ta_2TiO_{10}$, $Ni(OH)_2$, $Eu(OH)_2$, $ZnO_2$, Nickel Oxide, and $Cu_2O$, and mixtures of these.

These flakes are generally called 2D flakes, or plates, or sheets, or blades, and these thin flakes have unique properties different from their bulk form. But 2D flakes have unique properties in various thicknesses, not just monolayer atom thicknesses. Scientists have determined that flakes which are 3 layers of atoms thick, and 4 layers of atoms thick, and other thickness dimensions upwards of 100 nanometers thick have valuable characteristics, different from their bulk form and advantageous from their bulk form. $MoS_2$ in particular is a flake which is a triad of atoms, one layer of sulfurs, a middle layer of molybdenum atoms, and another layer of sulfur atoms. And a $MOS_2$ particle is commonly comprised of a few triads to several triads to tens of tens of triads thick.

In some embodiments the composite biocidal particle also includes radiation curing pre-polymers, thermoplastic polymers, electrons, holes, anti-infective agents, biocidals, dopants, metal particles, or mixtures thereof.

In still other embodiments the other particles include particles which cause the bulk of the coating to shrink. And in other embodiments, voids are present in the plurality of other particles which allows atmospheric air, oxygen, water vapor and water to directly contact the composite particle, including the flake shape particle. In these embodiments, this coating containing voids would be described as an open cell foam layer. In these embodiments, the molybdenum atoms are available to catalyze reactions with atmospheric air, oxygen, water vapor, and water. In still other embodiments, the other particles include materials which are highly permeable to water, oxygen and water vapor. Materials like cellulose, or silicone, or polymeric alcohols allow water, oxygen, and water vapor to permeate to contact the flakes within the plurality of other particles.

Zhao etal. have demonstrated that molybdenum disulfide ($MoS_2$) flakes can be an excellent solar disinfection agent for multi-drug resistant (MDR) bacteria with disinfection efficiencies 499.9999% in only 30 min. Distinct from other reactive oxygen species (ROS)-dependent photocatalysts, both ROS generation and size decrease contributed to the high antibacterial efficiencies of $MoS_2$ [25].

Yang etal. report that the ce-$MoS_2$ sheets could produce reactive oxygen species (ROS), different from previous report on graphene-based materials. Particularly, the oxidation capacity of the ce-$MoS_2$ sheets toward glutathione oxidation showed a time and concentration dependent trend, which is fully consistent with the antibacterial behavior of the ce-$MoS_2$ sheets. The results suggest that antimicrobial behaviors were attributable to both membrane exchange distortion and oxidation stress. The antibacterial pathways include $MoS_2$-bacteria contact induced membrane stress, superoxide anion ($O_2$·—) induced ROS production by the ce-$MoS_2$, and the ensuing superoxide anion-independent oxidation. Yang's study thus indicates that the tailoring of dimension of nanomaterials and their electronic properties would manipulate antibacterial activity [26].

Liu etal. have shown the therapeutic effect of reactive oxygen species (ROS)-involved cancer therapies is significantly limited by shortage of oxy-substrates, such as hypoxia in photodynamic therapy (PDT) and insufficient hydrogen peroxide ($H_2O_2$) in chemodynamic therapy (CDT). Liu reports a $H_2O_2/O_2$ self-supplying nanoagent, (MSNs@$CaO_2$—ICG)@LA, which consists of manganese silicate (MSN)-supported calcium peroxide ($CaO_2$) and indocyaninc green (ICG) with further surface modification of phase-change material lauric acid (LA). Under laser irradiation, ICG simultaneously generates singlet oxygen and emits heat to melt the LA. The exposed $CaO_2$ reacts with water to produce 02 and $H_2O_2$ for hypoxia-relieved ICG-mediated PDT and $H_2O_2$-supplying MSN-based CDT, acting as an open source strategy for ROS production. Additionally, the MSNs-induced glutathione depletion protects ROS from scavenging, termed reduce expenditure [27].

Tan etal. discussed the mechanisms of hydrogen peroxide ($H_2O_2$) decomposition and reactive oxygen species (R.O.S.) formation on the catalyst surface is always a critical issue for the environmental application of Fenton/Fenton-like reaction. Tan teaches activating $H_2O_2$ in a co-catalytic Fenton system with oxygen incorporated $MoS_2$, namely MoS-xOx-flakes. The $MoS_2$-xOx flake assisted co-catalytic Fenton system exhibited superior degradation activity of emerging antibiotic contaminants (e.g., sulfamethoxazole). Combining density functional theory (DFT) calculation and experimental investigation, Tan demonstrated that oxygen incorporation could improve the intrinsic conductivity of MoSr-xOx flakes and accelerate surface/interfacial charge transfer, which further leads to the efficacious activation of $H_2O_2$. Moreover, by tuning the oxygen proportion in MoSr-xOx flakes, Tan modulated the generation of ROS and further directed the oriented conversion of $H_2O_2$ to surface-bounded superoxide radical (·$O_2$-surface) [28].

Sarniak etal. reported that the main cellular source of reactive oxygen species (ROS) is mitochondrial respiratory chain and active NADPH responsible for the "respiratory burst" of phagocytes. In addition R.O.S. are produced in endoplasmic reticulum, peroxisomes, with the participation of xanthinc and endothelial oxidase and during autoxidation process of small molecules. The mitochondrial respiratory chain is the main cellular source of ROS. It is considered that in aerobic organisms R.O.S. are mainly formed during normal oxygen metabolism, as byproducts of oxidative phosphorylation, during the synthesis of ATP. The intermembranous phagocyte enzyme—activated NADPH oxidase, responsible for the "respiratory burst" of phagocytes, which is another source of ROS, plays an important role in defense of organism against infections [29].

Liu etal. show that the physiologically relevant reactive oxygen species (ROS) generation supported by the complex II substrate succinate occurs at the flavin mononucleotide group (FMN) of complex I through reversed electron transfer, not at the ubiquinone of complex III as commonly believed. Indirect evidence indicates that the unknown ROS-generating site within complex I is also likely to be the FMN group. It is therefore suggested that the major physiologically and pathologically relevant ROS-generating site in mitochondria is limited to the FMN group of complex I [30].

Fu etal. have shown that the overproduction of ROS can induce oxidative stress, resulting in cells failing to maintain normal physiological redox-regulated functions (31). The damage in cell function and development includes oxidative modification of proteins to generate protein radicals, initiation of lipid peroxidation, DNA-strand breaks, modification to nucleic acids, modulation of gene expression through activation of redox-sensitive transcription factors, and modulation of inflammatory responses through signal transduction, leading to cell death and genotoxic effects.

In some of these embodiments which generate hydroxyls, radicals, oxidizers and the like, the pathogen does not need to physically contact the biocidal, as the hydroxyls, radicals, and oxidizers transit throughout the ambient environment or liquid to stress and deactivate the pathogens.

The radicals can stress and deactivate the cell membranes and lipids, the nucleic acids, proteins, and antioxidant systems.

An interesting feature of metal nanoparticle (NP) is their strong plasmon field created by surface plasmon resonance. The field intensity decreases with the distance from the metal surface. When a fluorophore or PS is placed at the vicinity of the metal NP (about 10 nm from the metal surface) the electrons of the PS that are involved in the excitation/emission process, interact with the plasmon field of the metal NP. The interaction results in quenching or enhancement of the fluorescence level of PS and consequently of radical species and/or $1O_2$ [31].

Scharff etal. reported about the ability of photo excited supramolecular composites containing fullerenes C60 immobilized at nanosilica particles to generate reactive oxygen species (ROS) in cells of two types (rat thymocytes, and transformed cells of ascite Erlich carcinoma, EAC, and leucosis L1210). Scharff identified the damaging effect of photo excited C60-composites, which appeared to be selective and manifested in transformed cells, but not in thymocyte. Scharff showed during the irradiation of f aqueous solutions or cell suspensions in the presence of fullerene C60, the generation of reactive oxygen species is observed [32].

Yang etal. found that the antibacterial activity of ce-$MoS_2$ sheets was much more potent than that of the bulk $MoS_2$ powders used for the synthesis of ce-$MoS_2$ sheets possibly due to the 2D planar structure (high specific surface area) and higher conductivity of the ce$MoS_2$. Yang investigated the antibacterial mechanisms of the ce-$MoS_2$ sheets and proposed their antibacterial pathways. Yang found that the ce-$MoS_2$ sheets could produce reactive oxygen species (ROS), different from previous report on graphene-based materials. Particularly, the oxidation capacity of the ce-$MoS_2$ sheets toward glutathione oxidation showed a time and concentration dependent trend, which is fully consistent with the antibacterial behavior of the ce-$MoS_2$ sheets. The results suggest that antimicrobial behaviors were attributable to both membrane and oxidation stress. The antibacterial pathways include $MoS_2$-bacteria contact induced membrane stress, superoxide anion ($O_2\cdot-$) induced ROS production by the ce-$MoS_2$, and the ensuing superoxide anion-independent oxidation. The Yang study thus indicates that the tailoring of dimension of nanomaterials and their electronic properties would manipulate antibacterial activity [34].

Zhao etal. have demonstrated that molybdenum disulfide ($MoS_2$) flakes can be an excellent solar disinfection agents for multi-drug resistant (MDR) bacteria with disinfection efficiencies 499.9999% in only 30 min. Distinct from other reactive oxygen species (ROS)-dependent photocatalysts, both ROS generation and size decrease contributed to the high antibacterial efficiencies of $MoS_2$ [35].

Lakshmi Prasanna etal. have prepared a systematic and complete antibacterial study on well-designed and well-characterized microparticle (micro), nanoparticle (nano), and capped nano ZnO has been carried out in both dark and light conditions with the objective of arriving at the mechanism of the antibacterial activity of ZnO, particularly in the dark. The present systematic study has conclusively proven that reactive oxygen species (ROS) such as $\cdot OH$, $\cdot O_2-$, and $H_2O_2$ are significantly produced from aqueous suspension of ZnO even in the dark and are mainly responsible for the activity in the dark up to 17%, rather than $Zn_2+$ ion leaching as proposed earlier. Prasanna's work further confirms that surface defects play a major role in the production of ROS both in the presence and absence of light. In the dark, superoxide ($\cdot O_2-$) radical mediated ROS generation through singly ionized oxygen vacancy is proposed for the first time, and it is confirmed by EPR and scavenger studies [36].

Sarkar ctal. have shown that electrospray-deposited silver ions react with the $MoS_2$ NSs at the liquid-air interface, resulting in $Ag_2S$ nanoparticles which enter the solution, leaving the NSs with holes of 3-5 nm diameter. Specific reaction with the S atoms of $MoS_2$ NSs leads to Mo-rich edges. Such Mo-rich defects are highly efficient for the generation of active oxygen species such as $H_2O_2$ under visible light which causes efficient disinfection of water. $10^5$ times higher efficiency in disinfection for the holey $MoS_2$ NSs in comparison to normal $MoS_2$ NSs is shown. Experiments are performed with multiple bacterial strains and a virus strain, demonstrating the utility of the method for practical applications [37].

Morones etal reported that when bacterial cells were treated with silver, changes took place in its membrane morphology that produced a significant increase in its permeability affecting proper transport through the plasma membrane, leaving the bacterial cells incapable of properly regulating transport through the plasma membrane, and resulting in cell death. It is observed that silver nanoparticles penetrate inside the bacteria and cause damage by interacting with phosphorus and sulfur containing compounds such as DNA and regulating enzymes [38].

Black phosphorus flakes can cause physical damage to the cell wall by triggering intracellular periplasmic and cytoplasmic leakage. Similar observations of physical damage to cell membrane by macro-knife like behavior of 2D flakes penetrating the cell membrane were noted by Alimohammadi etal [39].

The thickness of some embodiments of 2D flakes varies from 0.3 nanometers to more than 100 nanometers. The height and width of these flakes varies from twice the thickness of its width to hundreds of times its thickness. Some scientists describe the flake edges as atomically sharp. These dimensions form edges that creates pores, or holes, or tears in the pathogen membrane. The longest axis length of a typical pathogen is approximately one micron, whereas the size of a typical human or mammalian cell is 50 microns.

And due to the randomness of the edge features of the myriad of flake profiles, some flakes have edges not unlike the serrations of a knife blade. Graphene has strength comparable to steel, whereas $MoS_2$ has half the strength of a comparable dimension steel flake. The pathogens become lacerated upon the blade like flake edges of the composite particle.

The primary reason why these blade shaped flakes do not harm human cells or mammalian cells, is that these cells are very specialized and also much larger than microorganism cells For example, a typical pathogen cell is only about 1-2 microns in its longest dimension. But human cells are much larger, around 25 microns in size. So the effect of the flake edge is limited relative to the size of a mammalian cell, whereas the flake edge causes substantial damage to the pathogen cell membrane. In addition, holes in the pathogen membrane allow radicals from the ambient to also stress the pathogen.

The pathogen is lacerated as the result of a number of events. As the pathogen increases in volume, it contacts the flake edge. And as it continues to increase in volume, the expansion of the membrane forces the flake edge deeper into the membrane of the pathogen.

During mitosis, new cells arise in an area which was formerly occupied by 1 cell, causing the newly formed cell membranes to sometimes contact and sometimes apply pressure to the flake edge, causing the flake edge to bury into the cell.

Vibration, air currents, cell expansion and contraction, changes in temperature and humidity—all can cause the pathogen to vibrate and move, repeatedly putting the pathogen into contact with the flake edge.

In some embodiments the semiconductive flake inundates the pathogen with radicals, when exposed to light or without light activation, in the dark, 24/7, 365 days a year. The semiconductive flake generates a multitude of electrons and holes. The ambient air or water provides a nearly unlimited source of reactants such as oxygen atoms, water molecules, and others which are converted into radicals. Whereas the single cell pathogen is not able to produce a comparable multitude of antioxidants. The pathogen is swamped by the multitude of radicals, and the constituents of the pathogen are stressed and ultimately deactivated by the multitudes of radicals.

Moreover, due to the inherent mechanical strength of the flakes, and their relatively high melting temperature (bas-$MoS_2$ has a melting point exceeding 2,000 degrees Fahrenheit), and their broad chemical resistance, the flakes permanently stress and deactivate pathogens—for years.

The antibacterial activities of graphene oxide and reduced GO were reported by Hu etal. in 2010. They observed that GO and rGO suspensions can efficiently inhibit the viability of Escherichia coli (E. coli) bacteria by damaging the cell integrity. They also found that GO has stronger antibacterial activities and lower cytotoxicity than rGO because of the distinct charges and functional groups on the surfaces [40].

Xiao etal. found that a small amount of graphene oxide (GO) flakes have a strong effect on sensitizing lipid membranes to the peptide melittin and dramatically decrease the threshold concentration of melittin for the killing of bacteria. Molecular leakage tests from model vesicles showed that pretreatment of membrane with GO, even at a low concentration of 0.1 μg mL−1, decreased the threshold working concentration of melittin to less than half of the initial value, while in the living bacteria tests, such sensitizing effect of GO reduced the MIC value of melittin by almost 10 times. By combining experiments and simulations, Xiao found that the sensitizing effect of GO was derived from its similar mechanical disturbance to cell membranes as that of melittin at high concentrations in membrane structures including lipid diffusion, packing state, and pressure distribution. Xiao's results provide a cost-effective strategy to enhance the antibacterial efficiency of AMPs for clinical use [41].

The metallic phase of IT-$MoS_2$ nanoflowers (NFs) and the semiconducting phase of 2H—$MoS_2$ NFs were prepared by a facile solvothermal and combustion method. The antibacterial activities, reactive oxygen species (ROS) generation, and light-driven antibacterial mechanism of metallic 1T-$MoS_2$ NFs and semiconducting 2H—$MoS_2$ NFs were demonstrated with the bacterium Escherichia coli (E. coli) under light irradiation. Results of the bacterial growth curve and ROS generation analyses revealed higher light-driven antibacterial activity of metallic IT-$MoS_2$ NFs compared to semiconducting 2H—$MoS_2$ NFs.

Electron paramagnetic resonance (EPR) spectroscopy demonstrated that the ROS of the superoxide anion radical ·$O_2^-$—was generated due to the incubation of IT-$MoS_2$ NFs and E. coli with light irradiation. Furthermore, E. coli incubated with metallic IT-$MoS_2$ NFs exhibited significant damage to the bacterial cell walls, complete bacterial destruction, and abnormal elongation after light irradiation. The light-driven antibacterial mechanism of metallic 1T-$MoS_2$ NFs was examined, and it was found that, under light irradiation, photoinduced electrons were generated by metallic 1T-$MoS_2$ NFs, and then the photoinduced electrons reacted with oxygen to generate superoxide anion radical which induced bacterial death [42].

Basu etal. Introduced defects on varied $MoS_2$ surfaces by suitable doping of nitrogen atoms in a sulfur-rich reaction environment, resulting in stable and scalable phase conversion. The experimental characterizations along with the theoretical calculations within the framework of density functional theory establish the impact of nitrogen doping on stabilization of defects and reconstruction of the 2H to IT phase. The as-synthesized $MoS_2$ samples exhibit excellent dye removal capacity in the dark, facilitated by a synergistic effect of reactive oxygen species (ROS) generation and adsorption. Positron annihilation spectroscopy and electron paramagnetic resonance studies substantiate the role of defects and associated sulfur vacancies toward ROS generation in the dark. Further, on the basis of its ample ROS generation in the dark and in the light, the commendable antimicrobial activity of the prepared $MoS_2$ samples against fungal pathogen Alternaria alternata was demonstrated [43].

Han etal. report a Cu, Pd co-doped $MoS_2$ particle as an efficient and stable Hydrogen Evolution Reaction (HER) electrocatalyst, which partially resolves the problem of hole and electron recombination and leads to high overall performance. Specifically, Han improves the electric conductivity of the $MoS_2$ by Cu dopant and realizes the phase transition of $MoS_2$ from pristine 2H phase to stable IT phase by Pd dopant [44].

Achieving a heterojunction using molybdenum disulfide or graphene or composites thereof extends the lifetimes of holes and electrons and keeps some of them from recombining and becoming inactive. The holes or electrons escape from recombination, and are available to reduce or oxidize nearby oxygen or water moisture and form oxides, radical, and hydroxyls.

Ji et al designed a facile one-pot solvothermal method to synthesize porous 1T-$MoS_2$ that is integrated with atomic doping of Cu atoms [45].

Wei et al proposed simple high-temperature calcination method was used to produce metallic molybdenum disulfide (1 T-$Li_xMoS_2$). The proposed method converts the 2H phase to the 1 T phase by doping commercial $MoS_2$ with lithium ions [46].

Gan et al reported about developed a simple yet effective method, cyclic voltammetry, to successfully tune the 2H/IT phase transition of multilayer $MoS_2$ nanosheets without using intercalation species. The phase transition is triggered by the electrochemical incorporation of S vacancies (obtained by electrochemical etching), which on the one hand injects electrons into the framework of S—Mo—S and on the other hand facilitates the sliding of S planes [47].

Altay Unal etal. have shown inhibition of the viral infection was tested in vitro with four viral clades, $Ti_3C_2Tx$ in particular, was able to significantly reduce infection only in SARS-CoV-2/clade GR infected Vero E6 cells. This difference in the antiviral activity, among the four viral particles tested, highlights the importance of considering the viral genotypes and mutations while testing antiviral activity of potential drugs and nanomaterials. Among the other MXenes tested, $Mo_2Ti_2C_3Tx$ also showed antiviral properties [48].

Galante etal. in their work demonstrates a coal-derived functionalized Graphene oxide coating applied to fabrics that exhibits antiviral properties even after mechanical abrasion or bleach washing. Graphene oxide is chemically exfoliated from low cost coal and functionalized with octadecylamine to render repellency properties. The functionalized graphene oxide is applied to polyethylene terephthalate (PET) fabric after wet etching which roughens the microfiber surface for better coating adhesion and liquid repellency. An additional polydimethylsiloxane (PDMS) layer on top of the functionalized graphene oxide further improves the repellency and durability. The functionalized nano-graphene oxide/PDMS coating robustly repels droplets of water and human saliva. Additionally, Galante demonstrates the antiviral properties with human adenovirus type 5 (HAdV5), herpes simplex virus type 1 (HSV-1), and betacoronavirus (CoV) even after mechanical abrasion and bleach washing [49].

Khamati etal. in their review show that the development of efficient antimicrobial agents against pathogenic bacteria is needed, especially for antibiotic-resistant bacteria and bacterial biofilms that are typically hard to be treated with conventional antibiotics. MXenes demonstrated attractive properties such as highly active sites, significant chemical stability, hydrophilicity, large interlayer spacing, huge specific surface area, and superior sorption-reduction capacity. These two-dimensional materials demonstrated efficient antibacterial properties against pathogenic bacteria. Additionally, antiviral effects of MXenes, as well as their immune compatibility and anti-inflammatory effects of them on human immune cells were illustrated [50].

Rozmyslowska-Wojciechowska etal. have shown the ability to stabilize the surface properties of MXenes has been demonstrated here through surface charge engineering. It was thus determined how changing the surface charges of two-dimensional (2D) $Ti_3C_2$ MXene phase flakes using cationic polymeric poly-L-lysine (PLL) molecules affects the colloidal and biological properties of the resulting hybrid 2D nanomaterial. Electrostatic adsorption of PLL on the surface of delaminated 2D $Ti_3C_2$ flakes occurs efficiently, leads to changing an MXene's negative surface charge toward a positive value, which can also be effectively managed through pH changes. Analysis of bioactive properties revealed additional antibacterial functionality of the developed 2D $Ti_3C_2$/PLL MXene flakes concerning *Escherichia. coli* Gram-negative bacteria cells [51].

Shamsabadi etal. demonstrated antibacterial properties of two-dimensional (2D) nanomaterials are of great interest in fields such as environmental engineering, biomedical engineering, and medicine. $Ti_3C_2Tx$ MXene, a novel 2D nanomaterial, has been reported to have excellent antibacterial activity against both Gram-negative and Gram-positive bacteria. This paper presents the first study aimed at determining the primary antibacterial mode-of-action of the MXene. Shamsabadi studied the antibacterial properties of MXene nanosheets with lateral sizes of 0.09, 0.35, 0.57, and 4.40 µm against *Escherichia coli* and *Bacillus subtilis* bacteria for 3 and 8 h in the dark. Quantitative analyses of bacteria species performed with complementary techniques, fluorescence imaging, and flow cytometry confirmed that the antibacterial activity of the MXene nanosheets is both size- and exposure-time-dependent. Smaller nanosheets showed higher antibacterial activities against both bacteria [52].

Malina etal. demonstrated its toxicological effects of graphene oxide (GO) on aquatic organisms have not been properly investigated. Malina compared the toxicity of differently oxidized graphene oxide systems towards the green alga Raphidocelis subcapitata and the cyanobacterium Synechococcus elongatus. The cyanobacterium exhibited higher GO sensitivity and more rapid growth inhibition than the alga, in keeping with the established antibacterial properties of GO. The toxic effects of GO included shading/aggregation of GOs and nutrient depletion, however a detailed mechanistic study revealed that GO acted against R. subcapitata via an additional, new mechanism. Remarkably, lightly oxidized GO samples induced significantly greater membrane integrity damage than more heavily oxidized GO samples. Flow cytometry and microscopy experiments revealed that lightly oxidized GO can act as a blade that causes mechanical damage to algal cells, probably because of the comparatively low coverage of oxygen-bearing functionalities at the edges of such GO sheets [53].

$MoS_2$ flakes (with or without iron) were vertically coated on titanium substrate via a one-step hydrothermal process, and their in vitro antibacterial mechanism was studied systematically under dark conditions. The results solidly evidenced that the antimicrobial efficacy of such $MoS_2$ nanosheets is a combined effect of ROS generation and ion release, which is independent on light illumination. Doping of iron in terms of FeMoO4 strengthens the bactericidal capability of the $MoS_2$ coatings through releasing ferrous ion and boosting ROS generation via Fenton-like reactions. These results provide new insights into the antibacterial mechanism of $MoS_2$ and may promote applications of the materials in biomedical devices [54].

Begun etal. reported the design of a novel composite platform using melittin antimicrobial peptide-attached $MoS_2$. Begun reported data showing that 100% of superbugs are killed using an antimicrobial peptide-attached PEG-$MOS_2$-AMP platform via a synergistic killing mechanism. Reported experimental data indicates that only 45% of MDRB killing is possible via $MoS_2$ flake-based PTT and PDT processes together, and it is mainly due to the lower heat generation during PTT and a small amount of ROS formation during PDT in the presence of 670 nm light. Begun reported data also show that about 20% of superbugs can be killed by the melittin antimicrobial peptide alone, whereas 100% of superbugs can be killed using melittin antimicrobial peptide-attached $MoS_2$ flakes with NIR light. This is due to the fact that, in the presence of the melittin antimicrobial peptide attached PEG-$MoS_2$-AMP composite platform, initially the melittin antimicrobial peptide makes pores on the surface of MDRB, and the pores help to diffuse heat and ROS easily during PDT and PTT. Due to the possible synergistic multimodal killing mechanism, 100% of MDRB were killed [55].

Chitosan exfoliated MoS$_2$ flakes were successfully synthesized by a simple, one-step green process. Electron microscopy of the synthesized flakes showed high degree of exfoliation of bulk MoS$_2$ into monolayered and few-layered flakes of uniform size. The flakes were also found to be highly stable and well dispersed in aqueous solution. Evaluation of antibacterial activity of the CS—MoS$_2$ flakes revealed the excellent potential of these flakes to cause growth inhibition of both Gram-negative and Gram-positive bacteria in a concentration and time-dependent manner. Detailed investigations into elucidating the mechanism of antibacterial action showed that the CS—MoS$_2$ flakes induced bacterial cell death through a combined action of membrane damage, metabolic inactivation, and oxidative stress. The synthesized flakes were also found to possess antibiofilm activity and showed high biocompatibility toward mammalian cells. It is of great significance to highlight the fact that the antibacterial and antibiofilm action of the chitosan exfoliated MoS$_2$ flakes were observed without the need for any additional surface functionalization of the flakes with complex ligands, biocidal nanoparticles, antimicrobial peptides, photosensitizers, or antibiotics and even in the absence of NIR assisted photothermal action [56].

Pandit etal. report a proof-of-principle study to evaluate the potential of functionalized two-dimensional chemically exfoliated MoS$_2$ (ce-MoS$_2$) toward inhibitory and bactericidal property against two representative ESKAPE pathogenic strain∂a Gram-positive *Staphylococcus aureus* (MRSA) and a Gram-negative *Pseudomonas aeruginosa*. More significantly, the mechanistic study establishes a different extent of oxidative stress together with rapid membrane depolarization in contact with ce-MoS$_2$ having ligands of varied charge and hydrophobicity. The implication of these results is discussed in the light of the lack of survivability of planktonic bacteria and biofilm destruction in vitro. A comparison with widely used small molecules and other therapeutics conclusively establishes a better efficacy of 2D ce-MoS$_2$ as a new class of antibiotics [57].

Perkas etal. reported about silver nanoparticles (NPs) were synthesized sonochemically by the reduction of silver ions with ethylene glycol and simultaneously deposited on different forms of TiO$_2$ powders (commercial Degussa P-25, synthetic anatase and mesoporous titania). The antimicrobial properties of Ag—TiO$_2$ were tested against a number of Gram-positive and Gram-negative bacteria. A high bactericidal effect was found in the absence of UV light. The reduction in bacterial viability was between 3 and 4.2 logs. Based on the experimental data it was concluded that enhanced antimicrobial activity of the Ag—TiO$_2$ originated from both the oxidative stress generated by silver nanoparticles and the presence of silver ions on the surface of the silver-titania composite [58].

Fonseca etal. reported on poly(lactic acid) (PLA) composites with titanium oxide (TiO$_2$)~10-nm nanoparticles were produced by the melting process and their main properties were evaluated. The particles are homogeneously dispersed in the matrix with a low degree of agglomeration, as seen by transmission electron microscopy (TEM). The crystallinity temperature increased—12% when 5 wt. % of TiO$_2$ was added, showing that the particles acted as nucleating agents this trend was confirmed by optical images. Regarding biocidal properties, after 2 h of contact the PLA/TiO$_2$ composites with 8 wt. % TiO$_2$ showed a reduction of *Escherichia coli* colonies of—82% under no UVA irradiation compared to pure PLA [59].

Wojciechowski etal. describe multilayered TiC$_2$ MXene-based materials such as Ti$_3$C2/Al$_3$+, Ti$_3$C$_2$/In and TiC$_2$/Ga, obtained by modifying the MXene surface with aluminum-, indium- and gallium alkoxides. In the synthesis of these materials, organometallic compounds of group 13 metals (Et$_3$A:, Me$_3$In, and Et$_3$Ga) were chosen as precursors for the alkoxides to modify the surface. To attach organometallic compounds to the MXene surface, their high reactivity towards the terminal OH, =O and F groups present on the MXene surface was used. In the next step, exposure of the surface-attached aluminum-, indium and gallium alkyls to air allowed their transformation into metal alkoxides due to the high reactivity of the metal-carbon bonds to oxygen and water. In this method of MXene modification, the alkoxide precursors can be extended to other organometallic compounds, such as groups 1, 2 and 12 alkyls. Microbiological studies of the developed 2D Ti$_3$C$_2$/Al$_3$+, Ti$_3$C$_2$/In and Ti$_3$C$_2$/Ga alkoxides showed no acute ecotoxicity to the tested microorganisms. The obtained materials did not influence bioluminescent/biosensor-type microorganisms nor reduce the viability of other types of microorganisms, such as *Staphylococcus aureus, Escherichia coli* or *Candida albicans* [60].

Camilli etal. have shown that chemical vapour deposition on catalytic metals has become a well developed approach for the growth of graphene and hexagonal boron nitride (BN), very few alternative approaches for synthesis on non-reactive supports have been explored so far. Camilli reports the growth of BN on gold, using magnetron sputtering of B in N$_2$/Ar atmosphere, a scalable method using only non-toxic reagents. Scanning tunnelling microscopy at low coverage shows primarily triangular monolayer BN islands exhibiting two 'magic' orientations on the Au(111) surface [61].

Non-limiting examples of linkers or ligands for MoS$_2$ are chitosan, ctab, dbsa, 3-mercaptoproprionic acid, 3-mercaptopropyl trimethoxysilane, and COOH+HEMA.

Galoppini collected in his review the synthesis and properties of sensitizers consisting of chromophore-linkers arrays where the linkers are based on alkyl chains, rigid-rods, or tripod-shaped molecules [62].

Xu etal. demonstrate a simple strategy to achieve high magnesium storage capability for Ti$_3$C$_2$ MXene by preintercalating a cationic surfactant, cetyltrimethylammonium bromide (CTAB). Density functional theory simulations verify that intercalated CTA+ cations reduce the diffusion barrier of Mg$_2$+ on the MXene surface, resulting in the significant improvement of the reversible insertion/deinsertion of Mg$_2$+ ions between MXene layers [63].

Hao etal. have shown a routine for mesoporous silica nanomaterials of different shapes (film, platelet, sphere, rod) were synthesized simply by tuning the mole ratio of dual cationic surfactant templates, cetyltrimethylammonium bromide (CTAB) and tetrabutylammonium iodine (TBAI). The film showed the most potent antibacterial activity against mycobacteria [64].

Mody et al have prepared review article that provides a glimpse to some simpler nanoparticles which are being currently modified for their potential applications in biomedical imaging using MRI, CT, ultrasound, PET, SERS, and optical imaging [65].

Rai et al have shown that nanotechnology provides a novel platform for the development of potential and effective agents by modifying the materials at nanolevel with remarkable physicochemical properties, high surface area to volume ratio and increased reactivity. Among metal nanoparticles, silver nanoparticles have strong antibacterial, antifungal and antiviral potential to boost the host immunity against pathogen attack. Nevertheless, the interaction of silver nanoparticles with viruses is a largely unexplored field. The present review discusses antiviral activity of the metal nanoparticles, especially the mechanism of action of silver nanoparticles, against different viruses such HSV, HIV, HBV, MPV, RSV . . . [66].

Hoseinnejad et al have described many inorganic and metal nanoparticles have been implemented to synthesize active food packaging materials and to extend the shelf-life of foods. Packaging with nanocomposites containing these nanoparticles offers advantages, such as reduction in the usage of preservatives and higher rate of reactions to inhibit the microbial growth. Nevertheless, the safety issues of employing the metal and inorganic nanoparticles in food packaging are still a major concern and more studies along with clinical trials need to be carried out prior to the mass production of these promising food containers. In this review, we have evaluated recent studies plus the applications of inorganic and metal nanoparticles mostly in food packaging applications along with their antimicrobial properties and reaction mechanisms [67].

Non-limiting examples of nanoparticles are gold nanoparticles, silver nanoparticles, FeO, $Fe_3O_4$, $FeO_3$, Cui, $TiO_2$, ZnO, CuO, MgO, $SiO_2$, Alumina, and CuO.

Ashraful Islam etal. teach that two-dimensional molybdenum disulfide (2D $MoS_2$) presents extraordinary optical, electrical, and chemical properties which are highly tunable by engineering the orientation of constituent 2D layers. 2D $MoS_2$ films with vertically-aligned layers exhibit numerous 2D edge sites which are predicted to offer superior chemical reactivity owing to their enriched dangling bonds. This enhanced chemical reactivity coupled with their tunable band gap energy can render the vertical 2D $MoS_2$ unique opportunities for environmental applications. Herein, we report that $MoS_2$ films with vertically-aligned 2D layers exhibit excellent visible light responsive photocatalytic activities for efficiently degrading organic compounds in contaminated water such as harmful algal blooms [68].

Yang et al described that two-dimensional (2D) materials, graphene and hexagonal-boron nitride (h-BN) are famous for protective coatings, because of their excellent chemical resistance, barrier property, impermeability along with thermal stability, and a large number of these properties are particularly suitable for protective coatings. However, the applications of graphene for metal protection have been limited by galvanic corrosion issues. Also, h-BN nanosheets are also explored as potential materials for corrosion protecting, especially, electrical insulation of h-BN is influential in solving electrochemical reaction and uniquely suitable to be used as an anticorrosion material [69].

Mazinani et al have shown that recently, 2-dimensional (2D) materials such as graphene oxide (GO), MXene, and hexagonal boron nitride (hBN) have received considerable attention for surface modifications showing their antibacterial properties. In this paper, a comparative study on the effect of partial deposition of these three materials over PEO titania substrates on the antibacterial efficiency and bioactivity is presented. Their partial deposition through drop-casting instead of continuous film coating is proposed to simultaneously address both antibacterial and osseointegration abilities. Our results demonstrate the dose-dependent nature of the deposited antibacterial agent on the PEO substrate. GO-PEO and MXene-PEO samples showed the highest antibacterial activity with 70(±2) % and 97(±0.5) % inactivation of S. aureus colonies in the low concentration group, respectively. Furthermore, only samples in the higher concentration group were effective against E. coli bacteria with 18(+2) % and 17(+4) % decrease in numbers of colonies for hBN-PEO and GO-PEO samples, respectively [70].

Lui et al have shown that graphene oxide (GO) was thought to be a promising antibacterial material. In his work, graphene oxide coatings on polymer substrate were prepared and the antibacterial activity against E. coli and S. aureus was investigated. It was demonstrated that the coatings exhibited stronger antibacterial activity against E. coli with thin membrane than S. aureus with thick membrane. Take into consideration the fact that the coatings presented smooth, sharp edges-free morphology and bonded parallelly to substrate, which was in mark contrast with their precursor GO nanosheets, oxidative stress mechanism was considered the main factor of antibacterial activity [71].

All of these printing processes are compatible with field generating equipment, including electrical field generating equipment. These printing processes charge composite particles in a liquid dispersion or powder with a potential as the composite particles are emitted from the printing device orifices or roller. In addition, all of these printing processes can be designed to keep separate the composite particles from contaminants until the moment of printing deposition, so that the composite particles remain sterile. If equipped with a computer controlled cutter, the actual working area of the plotting knife is relatively small, and the sterile medical device cleanliness could be maintained with a small area hepa filtered hood or similar accessory. And in some embodiments, the newly printed coating and substrate can be subject to rapid heating and ultraviolet exposure to maintain the sterile field as the newly printed and custom cut sterile medical device exits the printer. In some embodiments, a single medical device could be custom printed, exclusive to the patient's need, just in time, for application by the health professional.

There are many dozens of chemicals with flake-shaped particle morphology which fulfill this application. Without limiting the practice of this application, I will emphasize $MoS_2$ in fulfilling this application.

$MoS_2$ has been exfoliated worldwide for decades, with no significant toxicity. For decades $MoS_2$ has been used as a lubricant in automotive oil. The piston and cylinder walls of an automobile rotating at 7,000 r.p.m. are similar to a laboratory homogenizer rotating at 7,000 r.p.m. Government agencies world wide, including the Environmental Protection Agency have been analyzing automobile exhaust for decades without noting significant toxicity from $MoS_2$. Molybdenum is a trace element for humans as is sulfur. $MoS_2$ is currently allowed as a lubricant for food processing machines, and has been rigorously tested by the Food and Drug Administration.

Exfoliated $MoS_2$ is water clear.

Bulk $MoS_2$ is a diamagnetic, indirect bandgap semiconductor, with a bandgap of 1.23 eV. All forms of $MoS_2$ have a layered structure, in which a plane of molybdenum atoms is sandwiched between planes of sulfide ions. These three strata form a monolayer triad of $MoS_2$. Bulk $MoS_2$ consists of stacked triads, triads which are held together by weak Van der Waals interactions.

Crystalline $MoS_2$ naturally occurs in two phases, 2H—$MoS_2$ and 3R—$MoS_2$, where the "H" and the "R" indicate hexagonal and rhomboidal geometry, respectively. In these structures each molybdenum atom exists at the center of a trigonal prismatic coordination sphere and is covalently bound to six sulfide ions. Each sulfur atom has pyramidal coordination and is bound to three molybdenum atoms. Both the 2H- and 3R-phases are semiconducting phases of $MoS_2$.

The IT form of $MoS_2$ is trigonal in its geometry. In this phase, $MoS_2$ exhibits metallic properties. The metallic phase has ≈105 Siemens (or higher) electrical conductivity compared to the semiconducting phase. The IT phase has superior electron transfer capability.

The $MoS_2$ flake has few or no dangling bonds. Along the thin edge of the flake, some of the Molybdenum atoms have valence domains which are available to form associations. Voids in the sulfur layers make it possible for more associations to form with the Molybdenum atoms available.

The Van der Waals forces between the interlayers or triads of $MoS_2$ are very weak. Therefore, individual layers can be isolated using traditional mechanical cleavage techniques, such as chemical exfoliation, ball milling, and intercalation, among many other exfoliation techniques.

$MoS_2$ is relatively nonreactive and has a low coefficient of friction. Weak interlayer Van der Walls interaction present between the triads facilitates the exfoliation of bulk crystal into few layer or monolayer crystals or flakes, which exhibit layer dependent properties. In addition, monolayer $MoS_2$ has high electron mobility.

Another important property of $MoS_2$ monolayers is their high exciton binding energy (~0.5-1 eV) arising from substantially reduced dielectric screening relative to the bulk. This promotes strong and long-lived excitons.

The monolayer $MoS_2$ is a crystalline structure, whereby the upper and lower layers are planes composed of sulfur atoms, and the middle is a layer of metal molybdenum atoms. Each molybdenum atom in the layer covalently bonds with six sulfur atoms to form the Mitsubishi columnar coordination structure. Meanwhile, each sulfur atom combines with three molybdenum atoms through covalent bonding.

The structure of the layered metal dichalcogenides includes one hexagonal packed sheet of metal atoms sandwiched between two hexagonal sheets of chalcogen atoms. The coordination of the metal atoms by the chalcogen atoms is either hexagonal (e.g. titanium disulfide and Vanadium disulfide) or trigonal prismatic (e.g. molybdenum disulfide and niobium disulfide). The MX layers are kept together by Van der Waals forces and several stacking polytypes exist. There is weak bonding between triads, where a layer consists of a monolayer of metal atoms clad together by covalently bonded chalcogens.

The coordination and the oxidation state of the metal atom determine the electronic properties of the material. For example, the group V metal atoms (niobium and tantalum) are in a trigonal prismatic coordination and the corresponding dichalcogenide materials are metals, while group VI atoms (molybdenum and tungsten) are also in a trigonal prismatic coordination but have a full dz band and hence are semiconductors. Molybdenum disulfide has both a hexagonal and a trigonal prismatic coordination and can thus be either metallic or semiconducting respectively.

The major axis of the dichalcogenide flake shape refers to the longest portion of the dichalcogenide flake shape when being observed from the thickness direction thereof.

In some embodiments the metallic component of the chalcogenide is titanium, Zirconium, hafnium, Vanadium, tantalum, niobium, molybdenum, tungsten, or tin. Or gallium, or indium, or thallium. Or two-dimensional semiconductor includes at least one of a transition metal dichalcogenide, a CdTe single-layer, Gas, GaSe, GaS1-Sez, $CdI_2$, $PbI_2$, $K_2Al_4$ (Si $Al_2O_2$3) (OH, F) 4, $PbI_2$, $K_2Al4$ (Si $Al_2O_{23}$) (OH, F) 4, Molybdenum disulfide ($MoS_2$), molybdenum diselenide (MoSe), molybdenum ditelluride (MoTex), tungsten disulfide (WS), tungsten diselenide (WSez), tungsten ditelluride (WTe), niobium disulfide (NbS), niobium diselenide (NbSez), niobium ditelluride (NbTex), tantalum disulfide (TaSj, tantalum diselenide (TaSe), tantalum ditelluride (TaTe), hafnium disulfide (HfS), hafnium diselenide (HfSez), hafnium ditelluride (HfTez), titanium disulfide (TiS), titanium diselenide (TiSex), and titanium ditelluride.

The layered metal chalcogenides include any compounds comprising metal atoms and chalcogen atoms in a layer-type structure. Examples include layered metal dichalcogenides and layered metal monochalcogenides. The layered metal dichalcogenides have the chemical formula MX wherein M represents a metal and X represents a chalcogen (i.e. sulfur, selenium or tellurium). The structure of the layered metal dichalcogenides preferably includes one sheet of metal atoms sandwiched between two sheets of chalcogen atoms. In the layered metal dichalcogenides, the metallic component M is preferably selected from transition metals Such as titanium, zirconium, hafnium, vanadium, tantalum, niobium, molybdenum and tungsten and non-transition metals such as tin. More preferred are niobium, molybdenum, tantalum, tin and tungsten, and most preferred are niobium, molybdenum and tantalum. More preferred chalcogens are sulfur, selenium and tellurium, and most preferred are sulfur and selenium. Metals that form monochalcogenides which may be suitable include gallium, indium and thallium.

Implanting impurities into dichalcogenides using laser beam energy is similar to the doping of silicon using impurities (dopants) and laser energy.

The laser serves two major functions: (i) creation of sulfur vacancies in the dichalcogenide flakes and coincidentally (ii) breaking the bonds of the dopant impurities, and then the released ions and fragments then diffuse and implant into the empty sulfur vacancy sites within the crystal lattice structure of the dichalcogenide.

In our workshop in one embodiment we doped $MoS_2$ by irradiating it using a 450 nanometer laser, in another embodiment a 523 nanometer laser, and in another embodiment a 780 nanometer laser.

The dopants are deposed proximal to the dichalcogenides. The dopant can be in a liquid solution and deposed onto the dichalcogenide or proximal to the dichalcogenide, or the dopant can be deposited as a powder on to the dichalcogenide, and in some embodiments the dopant can be in a gaseous state.

Laser doping of dichalcogenides differs from the doping of silicon as the laser doping of monolayer and few layer dichalcogenides is very fast, and because the dopants are implanted throughout the flake layers. In some embodiments, the masking of the dichalcogenide flakes is quite simple, as the top surface of the dielectric layer forms an impenetrable barrier to the impurities, and also attenuates the laser energy.

Silicon wafers require considerably more time to reach sufficient doping compared to dichalcogenides, due to the thickness of the silicon wafer, to achieve a sufficient level of doping within the first few hundred nanometers of the thickness profile of the wafer. With dichalcogenides, however, after exfoliation, the dichalcogenides are sometimes monolayer, few layer, and many layer. Since the dichalcogenides are thin flake shaped, the dopant impurities can quickly penetrate within the few nanometer thick profile of the dichalcogenide within short time durations (e.g. immediately).

Since the dichalcogenides dope so quickly, in some embodiments the flakes can be laser irradiated and doped continuously using a printing press.

A laser beam is a device that emits light through a process of optical amplification based on the simulated emission of electromagnetic radiation.

Electron-beam curing is a method of curing paints and inks without the need for traditional solvent. Electron-beam curing produces a finish similar to that of traditional solvent-evaporation processes, but achieves that finish through a polymerization process, typically without using photoinitiators.

Ion beams can also cure acrylates similar to laser beams or electron beams.

Dissociation in chemistry is a general process in which molecules (or ionic compounds such as salts and complexes) separate or split into smaller particles such as atoms, ions, or radicals.

During crosslinking of some ultraviolet curing resins, the volume dimensions of the ultraviolet coating shrinks and compresses. This is called by some as NC, or normal compression. Moeck et al. (3) of Rahn teach "The volume shrinkage of acrylates and methacrylates occurs during polymerization and is due to the replacement of long-distance connections via weak Van der Waals force by strong short covalent bonds between the carbon atoms of different monomer units. This volume shrinkage causes serious problems including a large build-up of internal stress, which results in defects formation, and dimensional changes . . . ."

Voiry et al. teach: " . . . different phases in single layer TMDs can also be realized. A single layer of TMDs can have a trigonal prismatic" (crystal lattice structure) "phase or an octahedral" (crystal lattice structure) "phase. The trigonal prismatic phase, is also referred to as the 2H phase (or 1H in the case of a single-layer) and can be described by a hexagonal symmetry (D3h group) and corresponds to a trigonal prismatic coordination for the metal atoms. This geometry means that in single-layers, the sulfur atoms are vertically aligned along the z-axis and the stacking sequence is then AbA where A and b denote chalcogen and metal atoms, respectively The octahedral phase has a tetragonal symmetry (D3d) and corresponds to an octahedral coordination of the metal atoms. In the octahedral phase, conventionally referred to as the 1T phase, one of the sulfur layer is shifted compared to the others resulting in an AbC stacking sequence. The filling of the d orbitals of the metal directly influences the atomic structure of the TMD layers. For the 1H phase, the d orbital splits into 3 degenerate states dz2, $dx_2$-$y_2$, xy and dxy, yz with an energy gap of ~1 eV between the dz: and $dx_2$-$y_2$-xy orbitals. For the tetragonal symmetry of the 1T phase, the d orbitals of the metal degenerate into dxy, yz, zx ($t_2g$) and $dx_2$-$y_2$, $z_2$ (eg) orbitals. Up to 6 electrons can fill the $e_2g$ orbital. Since the p orbitals of chalcogens are located at much lower energy than the Fermi level, only the filling of the d orbitals determines the nature of phases in $MX_2$ compounds. Completely filled orbitals give rise to semiconducting behavior while partial filling induces metallic behavior."

Bhattacharyya et al. teach the strain engineering of dichalcogenides: "The applied NC" (normal compressive) "strain leads to S-M" (semiconducting to metallic) "transition for all the multilayers and bulk $MoS_2$. The band gap reduces smoothly and becomes zero at a threshold strain." "The change in the electronic structure under the application of strain was analyzed for each multilayer . . . ." "With the increase in normal compression, the degenerate bands begin to split . . . . The splitting is observed to be more prevalent in the valence band (VB) as compared to the conduction band (CB). The VB as well as the CB start to move towards the Fermi level with strain, reducing the band gap smoothly . . . . An S-M transition occurs when the VB crosses the Fermi level . . . ."

Scientists teach that 1T $MoS_2$ is unstable and metastable, and reverses spontaneously to non 1T phases.

In our workshop we demonstrated that the buried portion of the flake which was immersed in polymerizing pre-polymer that was shrinking, was converted to metallic conductivity, while the protruding portion of the flake remained semiconductive conductivity, thus forming a strain engineered heterojunction. The laser doping made the protruding portion of the flake more n-type. We also demonstrated that our construction permanently locks the differing phases of the flake, so the heterojunction was stable.

UV resins exert compressive stain on materials contained within them due to a reduction in volume when exposed to UV light. The UV light radically cleaves the photo initiator molecules present in the resin mixture which initiates polymerization and increases crosslinking density. This causes an increase in polymer density through the forming of complex matrices within the coating. When a material is contained within the resin during the curing process a compressive strain causes the material to shrink and be compressed. In some embodiments, there is an attractive force that binds the resin to the material being compressed. This attractive force could be bonds, electrostatic attractions or as simple as Van der Waals forces. This compression can alter material characteristics through molecular geometry shifts, leading to smaller band gaps, differing conductive properties as well as other novel effects. The resin molecules themselves do not shrink, however the polymerization and cross linking draw these molecules closer together and create an increased crosslink density.

During our development of these novel embodiments, we observed that during ultraviolet curing, that the conductivity of the buried flakes changed from semiconductive to metallic. Also, during our development of these novel embodiments, we observed that the metallic conductivity of the buried flakes maintained for months after the ultraviolet curing, with virtually no change in the conductivity of the buried flakes. We concluded that the ultraviolet curing monomers mutually compressed the buried $MoS_2$ flakes, as the monomers polymerized, and changed from long-distance connections to short covalent bonds. Bond lengths between the sulfur atom and the molybdenum atom are elongated as a result of compressive force from the resins shrinking during polymerization. The elongation of the crystal lattice allows the valence band and the conduction band to become much closer in energy, thus allowing for much easier charge transfer when compared to the valence-conduction band energy gap in a semiconductor. The band gap must be sufficiently small enough that electrons can freely jump in energy level and create effective conductive charge transfer.

The compression of the flakes shifts the crystal lattice of the $MoS_2$ from rhomboidal 2H geometry exhibiting semi-conductive nature, to the lattice geometry of 1T octahedral. Said geometry change aligning the valence and conduction band so that the flake exhibits metallic characteristics. This creates a smaller band gap, thus giving the electrons higher mobility between the two bands resulting in higher conductivity.

In $MoS_2$, the 1T arrangement is catalytically active on its basal sides as well as its edges.

Other non-limiting methods apply compressive strain to buried dichalcogenide flakes, such as the capillary forces developed during the evaporation of water from a mixture, solvent induced shrinkage, curing under pressure of an epoxy like SU7, and heat shrinkage (e.g. "shrinky dink" polystyrene.)

Some acrylate resins are known to shrink during polymerization, to reduce the actual coating volume of the acrylate resins. In some embodiments, the resin is comprised of acrylate resins and other materials that densely crosslink, with bonds that shorten during polymerization. In some embodiments, the acrylate resins and polymerization initiators polymerize with exposure to ultraviolet radiation, or near visible light radiation, or visible light radiation. Some non-limiting examples of acrylate resins which shrink during curing are TMPTA (Trimethylolpropane triacrylate), HDDA(1,6-hexanediol diacrylate), and 2-PEOA(2-Phenoxyethyl Acrylate). In some embodiments the resins are cured using electron beam radiation or ultrasonic radiation or high frequency radiation.

In some embodiments, a portion of the dichalcogenide flake is buried in the coating comprised of other particles, and the remainder of the dichalcogenide flake protrudes from the coating. The plurality of other particles surrounds the dichalcogenide flake, and contacts the many corners, facets, planes and edges of the random dichalcogenide flake shape. Some of the other particles may have chemical bonds to the dichalcogenide flakes. As the bonds of the coating partly comprised of other particles shorten and the yaer of other particles shrinks and reduces in volume, the layer of other particles coincidentally applies compressive strain to the many corners, facets, planes, and edges of the buried portions of the dichalcogenide flakes, causing strain upon the dichalcogenide flakes.

In some embodiments, the layer of other particles includes linkers which promote the covalent bonding between the layer of other particles and the dichalcogenide flakes. Non-limiting embodiments are $MoS_2$+linker+other particles, graphene+linker+other particles, reduced graphene+linker+other particles, graphene oxide+linker+other particles, black phosohorous+linker+other particles, BCN-graphene+linker+other particles, fluorographene+linker+other particles, white phosohorous+linker+other particles, $WS_2$+linker+other particles, MoSe2+linker+other particles, $WSe_2$+linker+other particles, $MoTe_2$+linker+other particles, $WTe_2$+linker+other particles, $NbSe_2$+linker+other particles, $NbS_2$+linker+other particles, $TaS_2$+linker+other particles, $TiS_2$+linker+other particles, $NiSe_2$+linker+other particles, $SnS_2$+linker+other particles, $ZrS_2$+linker+other particles, MnS+linker+other particles, MnTe+linker+other particles, ZnS+linker+other particles, $GeS_2$+linker+other particles, $ZrSe_2$+linker+other particles, GeS+linker+other particles, $GeS_2$+linker+other particles, GaSe+linker+other particles, GaTe+linker+other particles, InSe+linker+other particles, $Bi_2Se_3$+linker+other particles, Mica+linker+other particles, $MoO_3$+linker+other particles, $WO_3$+linker+other particles, $TiO_2$+linker+other particles, $MnO_2$+linker+other particles, $V_2O_5$+linker+other particles, $TaO_3$+linker+other particles, $RuO_2$+linker+other particles, $LaNb_2O_7$+linker+other particles, $(Ca,Sr)_2Nb_3O_{10}$+linker+other particles, $Bi_4Ti_3O_{12}$+linker+other particles, $Ca_2Ta_2TiO_{10}$+linker+other particles, $Ni(OH)_2$+linker+other particles, $Eu(OH)_2$+linker +other particles, $ZnO_2$+linker+other particles, Nickel Oxide+linker+other particles, and $Cu_2O$+linker+other particles, In some embodiments, these linkers occupy available sulfur vacancies, and likewise bond to the ingredients of the layer of other particles.

This compressive strain upon the buried portion of the dichalcogenide flake converts the buried portion of the flake from semiconducting to metallic conductivity.

$MoS_2$ is strongly responsive to electromagnetic fields. And the $MoS_2$ flake has its strongest electromagnetic response along the major axis of the flake, which is synonymous with the longest axis of the flake.

Electromagnetic field deposition of dichalcogenides occurs as a result of industrial deposition processes such as inkjet printing, continuous inkjet printing (CU), xerography, electrophotography, photocopying, laser printing, electrophoretic aka electrophoresis, pressure less printing, corona poling, electrostatic spraying, flocking, powder coating among other processes.

During electromagnetic deposition processes, an electrical charge is applied proximal to the $MoS_2$ flakes. The charge potential can be positive or negative. After an electrical charge is applied to the $MoS_2$ flakes, the flakes are brought into proximity to a substrate or electrode of the opposite electrical charge, causing the flakes to be attracted to the oppositely charged substrate or electrode.

Since the greatest charge polarity is along the major axis of the flakes, each flake is planted with its major axis approximately normal to the electrode or substrate. The wording particles oriented in a direction "approximately normal" to said substrate, as referred to in these embodiments, includes, as a matter of course, the case where any angle formed by the major axis of each particle and the top surface is 90 degrees. The wording also includes the case where a deviation from 90 degrees to an extent such that the foregoing angle can be considered to be substantially normal is present (for example, the case where the foregoing angle deviates from normal by 10 degrees or less, or the foregoing angle deviates from normal by 5 degrees or less, and preferably the foregoing angle deviates from normal by 2 degrees or less.)

In these embodiments, the major axis of each composite particle and a top surface of said substrate are oriented approximately normal to each other. When these elements are approximately normal to each other, the angle formed by each other is within the range that the effects of these embodiments are achieved.

In some embodiments, as the mixture of dichalcogenide flakes and solvent transit, the solvent evaporates as the motion of the flake continues. It is attracted to the oppositely charged substrate or electrode, and buries a portion itself into the layer of other particles, with its major axis having an orientation approximately normal to the substrate or electrode. If the flake has a major axis longer than the thickness of the layer of other particles, then the opposite end of the flake remains protruding from the surface of the layer of other particles. In some embodiments the protruding portion of the flake is modified with dopants or impurities which change the characteristics of the flake, generally changing the work function of the protruding portion. In some embodiments the layer of other particles functions as a mask or barrier preventing the impurities from penetrating into the layer of other particles and contaminating the portion of the flake buried in the layer of other particles. In some embodiments the protruding portion of the flake is doped with atoms like Oxygen, Nitrogen, Rhenium, Niobium, Zinc, Tungsten, Molybdenum, Iron, Chromium, Manganese, Vanadium, Selenium, Sulfur, Tellurium, Phosphorus, Potassium, Hydrogen, and Chlorine. In some embodiments the flake is described as bi-phasic. In these embodiments the portion of the flake which is buried in the layer of other particles retains the original characteristics of the flake, while the portion of the flake protruding from layer of other particles is changed by the impurities. After doping, the flake has two phases, that is, it is a heterojunction. But since the dichalcogenide is a single continuous flake, it is a heterojunction with little or no contact resistance between the n type portion of the flake and the p type portion of the flake.

In some embodiments, the coating changes phase relative to temperature. Examples of phase change coatings are hot melt glues and thermoplastic toner ingredients used in copiers and laser copiers. Exemplary hot melt glues are polyethylene and polyvinyl acetate. Exemplary toner ingredients are waxes.

In some embodiments, the viscosity of the coating layer can change as the result of phase change or polymerization or ultraviolet curing or other processes. In some embodiments, the characteristics of the coating change dramatically from a relatively low viscosity fluid, and change to a gel, or a stiff gel, or a solid, changing from a liquid phase to a solid phase. Examples of viscosity changing materials are gelatins, gels, gums, hot melt glues, thermoplastic toner ingredients, fast polymerizing materials, ultraviolet curing resins, and other materials. Once the coating has assumed a semi-solid or solid phase, the orientation of the major axis of the dichalcogenide flake is fixed.

In some embodiments the coating layer includes thickeners chosen from the group comprising thixotropics, resins, foams, sol-gels, gels, gelatins, cellulosics, acrylamides, acrylates, polymers, rheology agents, inorganic thickeners, ultraviolet curing resins, and additives.

In some embodiments the coating changes from a liquid to a stiff gel or semi solid as a solvent or water evaporates from the coating. Examples of these coatings are gelatin, agar, gums, and various celluloses. While the coating is in a low viscosity phase, a charge is applied to the coating, or a second electrode in contact with the coating. Then a device gives a second electrode an electrical charge opposite that of the second electrode. The dichalcogenide flakes are then are attracted to the second electrode. As the flakes transit to the second electrode coating, the flake is oriented with its major axis coincident with the electromagnetic field lines, which is generally normal to the coating on the second electrode.

Once a portion of the flake is buried in the coating, the orientation of the flake is maintained by the interaction of the charge on the dichalcogenide flake, and the opposite charge of the coating electric field, again coincident with the electromagnetic field lines. As the solvent or water evaporates from the coating layer, the coating changes state to a stiffer gel, a semi-solid, or a solid phase. Once the coating has changed state to a semi solid or solid or stiff gel, the flake is permanently fixed in its orientation, and the electrical fields can be discontinued.

The flake shape of the dichalcogenide allows easy penetration through the dielectric coating and embedding the edge of the flake into the charge transfer layer and electrode layer.

In some embodiments, the coating changes phase relative to temperature. Examples of phase change coatings are hot melt glues and thermoplastic toner ingredients used in copiers and laser copiers. Exemplary hot melt glues are polyethylene and polyvinyl acetate Exemplary toner ingredients are waxes.

In some embodiments the major axis of each flake is oriented nonparallel with respect to the device. In some of these embodiments the plurality of flakes are disposed at the same angle. But in other embodiments, the major axis of the flakes varies from flake to flake, with orientation angles which differ from flake to flake, disordered.

In some embodiments the coating is a mixture of ultraviolet curing resins. During exposure to ultraviolet light, the mixture of ultraviolet curing resins, change state, from a low viscosity fluid, to a gel, to a semi-rigid gel, or to a solid resin mixture. In some embodiments the coating is a mixture of ultraviolet curing resins . Exemplary components of ultraviolet curing resins are; photo initiators, additives, cross-linkers like TMPTA, and acrylates like TEGDA. In some embodiments, the dichalcogenide flakes are deposited using electrostatic processes and similar electromagnetic processes. During electrostatic deposition or electromagnetic deposition, the dichalcogenide flakes penetrate the mixture of ultraviolet curing resins and the flakes contact the conductive substrate underneath the resin. But after ultraviolet curing the ultraviolet curing resin mixture changes from a low viscosity fluid into a stiff gel or a solid. The solid state of the ultraviolet curing resin fixes the orientation of the major axis of the flake relative to the underlying first electrode or substrate. After curing, the flake is locked into intimate contact with the first electrode. In some embodiments, the barrier properties of the gee coating layer prevent oxidants, water, and contaminants from affecting the flake. In some embodiments, the gate coating layer resin functions as a mask, and inhibits the impurities or dopants from implanting to the dichalcogenide flakes and prevents the dopants from changing the character of the buried portion of the flakes.

There are a number of methods to emit and deposit the plurality of biocidal composite particles with their longes axis aligned approximately normal to the electrical potential applied to the substrate or member. Here are some of the methods to emit and deposit the biocidal composite particles: inkjet printing, continuous inkjet printing, xerography, electrophotography, photocopying, laser printing, electrophoresis, pressure less printing, corona poling, electrostatic spraying, electroless spraying, flocking, and powder coating.

Here are a few non limiting examples:

Example 1

Heat is applied to a thermoplastic film sheet.

At approximately the glass transition temperature of the film, a potential is applied to the film, and a potential of the opposite sign is applied to the flakes.

The coercive electrical field causes the flakes to transit to the thermoplastic film sheet, and the flakes partly embed into the film surface, with some of the flake protruding from the film sheet surface.

As the thermoplastic film cools below its glass transition temperature, the flake becomes fixed and oriented approximately normal to the substrate.

Example 2

An ultraviolet curing or visible light curing resin is applied as a coating to a film sheet. Then a potential is applied to the film, and an opposite potential is applied to the flakes. Under the coercive effect of the electrical field, the flakes transit to the ultraviolet curing coating.

The flakes bury one portion of the flake into the uv curing resin, while the remainder of the flake remains protruding from the composite flake into the ambient air.

Ultraviolet light or visible light cures the resin, and the flake becomes fixed and oriented approximately normal to the substrate.

In some embodiments, additional materials are deposited to contact the 2D flake.

Example 3

A potential is applied to a substrate. In some embodiments, there is a coating on this substrate. The opposite potential is applied to a liquid dispersion including molybdenum disulfide flakes. In some embodiments the dispersion includes linker particles.

Drops of the composite particles are emitted, and they transit to the substrate or substrate and coating. During the transit of the composite particles, the volatile solvent carrier or water which is proximal to the molybdenum disulfide flake evaporates away. The newly solvent free flake embeds itself into the substrate or coating under the influence of the electrical field.

Example 4

A potential is applied to a substrate. A potential is applied to a toner like mixture. The toner like mixture is comprised of water or solvent, 2d flakes, and thermoplastic particles. As the toner like mixture becomes proximal to the charged substrate, the 2D flakes and thermoplastic particles are deposited on to the substrate. The substrate continues to have potential. The toner like mixture also maintains its potential. As the toner like mixture approaches the substrate, the flakes AND the toner transit to the substrate. Heat is applied to the substrate, and heat causes the thermoplastic particles in the toner to melt and flow and adhere to the substrate. Since the potential is continuously applied to the substrate, the composite particles maintain their normal orientation to the substrate. As the heat temperature is reduced, the thermoplastic resins change state and change from being a glassy resin and become a rigid resin, fixing the aligned 2d flakes into their normal orientation.

Example 5

A potential is applied to a substrate. A coating is applied to this same substrate. The opposite potential is applied to a dispersion of 2D flakes in a solvent. The dispersion is emitted by a spray nozzle, and the major axis of the flake is oriented normal to the top surface of the coating as the flakes are embedded into the coating on the substrate. The durometer and the viscosity of the coating applied to the substrate is sufficient to allow the flakes to embed into the coating, and the flakes' normal position is maintained in the coating under the influence of the field, without the coating being excessively disturbed. The coating is subjected to a curing means, and the coating becomes rigid, trapping the 2d flake aligned normal to the top surface of the coating Example 6

A potential is applied to a substrate.

The opposite potential is applied to a mixture of powder coating compatible resin and flakes.

The mixture of powder coating resin and flakes transit to the substrate.

Heat is applied to the substrate, causing the powder coating resin to melt and conform to the substrate and the vertically aligned flakes.

The powder coating fixes the flakes normal to the substrate.

Non-limiting examples of animal devices: bandages, teat protectors, cages, collars, feeding troughs, pen surfaces, barn surfaces, egg roll out nests, nursery beds, bandages, teat protectors, cages, collars, feeding troughs, pen surfaces, barn surfaces, egg roll out nests, nursery, and identification plate.

Non-limiting examples of human devices: contact lenses; cannulae; Catheters, in particular urological catheters such as bladder catheters or urethral catheters; tubing, fluid bags, septa, stopcocks, clamps, filters, catheters, needles, cannulae; central venous catheters; Venous catheters or inlet or outlet catheters; Dilatation balloons; Catheters for angioplasty and biopsy; Catheters used for the insertion of a stent, a graft or a kavafilter; Balloon catheters or other expandable medical devices; endoscopes; Larnygoskopen; Tracheal devices such as endotracheal tubes; A-term devices and tracheal suction devices; bronchoalveolar irrigation catheters; Catheters used in coronary angioplasty; Pacemaker parts; Cochlear implants; Dental implant tubes for feeding; Dränageschläuchen; Guidewires; Gloves; Stents and other implants; extracorporeal blood tubes; Membranes, as for dialysis; Blood filters; Apparatus for circulatory support; Dressing materials for wound care; Harnbeuteln; ostomy bags; Implants containing a medically effective agent, such as medically acting stents or for balloon surfaces or for contraceptives; Endoscopes, laryngoscopes and feeding tubes.

In other embodiments, the composite flakes can coat the interior of pipes, valves, heat exchangers, condensers power plants, oil and gas pipelines, public water supply systems, sewers], marine engineering infrastructure, water cooled heat exchangers, radioactive disposal facilities, water treatment membranes to inhibit biofouling.

In some embodiments, the composite particles can be added to liquids such as water, without the composite particles binding to a member or surface. Pathogens contained within the water and contact the flakes are lacerated. Holes generated by the composite particles ultimately reduce water to form hydroxyls, which deactivates the pathogens within the liquid.

In more embodiments the composite biocidal particle can be applied to flora including organic crops for animal consumption and organic crops for human consumption. $MoS_2$ is a natural nutrient found in nature and does not need much post extraction chemistry. $MoS_2$ is biodegradable and molybdenum and sulfur are soil nutrients.

In further embodiments, the biocidal coating can be applied topically to cows, chickens, sheep, fish, pork and more. $MoS_2$ can adhere to feathers, skin, hides, hair, beaks, horns, and hooves, as the Zeta Potential of $MoS_2$ can be exploited to bind to keratin.

The words used in this document can be used interchangeably and have similar meanings: flake, plate, sheet, blade, bidimensional, 2D, and fewlayer or few layer. Sometimes the words have a prefix like micro as in microflake, or microplate.

An added advantage of 2D antimicrobials is taught by many scientists, that these novel 2D antimicrobials do not encourage antibiotic resistance.

Papi teaches: "These mechanisms are less likely to induce bacterial resistance and have a long-term effect, being based on mechanical action and independent to any drug reservoir" [74].

The invention claimed is:

1. A biocidal coating for deactivating a pathogen, said coating comprising:
   a plurality of flake-shaped particles, said plurality of flake-shaped particles selected from the group consisting of $MoS_2$, graphene, reduced graphene, graphene oxide, black phosphorous, white phosphorous, $WS_2$, $MoSe_2$, $WSe_2$, $MoTe_2$, $WTe_2$, $NbSe_2$, $NbS_2$, $TaS_2$, $TiS_2$, $NiSe_2$, $SnS_2$, $ZrS_2$, MnS, MnTe, ZnS, $GeS_2$, $ZrSe_2$, GeS, GaSe, GaTe, InSe, $Bi_2Se_3$, mica, $MoO_3$, $WO_3$, $TiO_2$, $MnO_2$, $V_2O_5$, $TaO_3$, $RuO_2$, $LaNb_2O_7$, $(Ca,Sr)_2Nb_3O_{10}$, $Bi_4T_3O_{12}$, $Ca_2Ta_2TiO_{10}$, $Ni(OH)_2$, $Eu(OH)_2$, $ZnO_2$, nickel oxide, and $Cu_2O$, and mixtures thereof;
   a plurality of linkers distinct from said plurality of flake-shaped particles, each of said plurality of linkers having at least one functional group, said functional group selected from the group consisting of mercapto groups, thiol groups, carboxylate groups, hydroxyl groups, silane groups, amino
   groups, glucosamine groups, and mixtures thereof, and
   a plurality of polymer additives distinct from said flake-shaped particles, said plurality of polymer additives comprising at least one of a radiation curing prepolymer, a thermoplastic polymer, or a thermoset polymer; wherein, said plurality of linkers bind said plurality of flake-shaped particles to said plurality of polymer additives; and
   at least one of said plurality of flake-shaped particles protrudes from said plurality of polymer additives; and
   wherein, a major axis of at least one of said plurality of flake-shaped particles
   has an angle to a top surface of at least one of said plurality of polymer additives,
   said foregoing angle has a deviation from normal,
   said deviation from normal being no greater than 10 degrees.

2. The biocidal coating of claim 1, wherein said plurality of flake-shaped particles are photocatalysts.

3. The biocidal coating of claim 1, wherein at least one of said plurality of flake-shaped particles has a serrated edge profile.

4. The biocidal coating of claim 1, wherein at least one of said plurality of flake-shaped particles lacerates a surface associated with said pathogen.

5. The biocidal coating of claim 1, wherein said plurality of flake-shaped particles function as a catalyst irrespective of light.

6. The biocidal coating of claim 1, wherein said plurality of flake-shaped particles generate electrons, said electrons reducing oxygen for deactivating said pathogen.

7. The biocidal coating of claim 1, wherein at least a portion of said plurality of flake-shaped particles is exposed to an ambient environment.

8. The biocidal coating of claim 1, wherein said plurality of flake-shaped particles deactivate said pathogen by denaturing proteins associated with said pathogen.

9. The biocidal coating of claim 1, wherein said plurality of flake-shaped particles deactivate said pathogen by depolarizing a membrane of said pathogen.

10. The biocidal coating of claim 1, wherein said plurality of flake-shaped particles deactivate said pathogen by extracting contents of said pathogen.

11. The biocidal coating of claim 1, wherein said plurality of flake-shaped particles generate holes, said holes oxidizing water for deactivating said pathogen.

12. The biocidal coating of claim 1, wherein said deviation from normal being no greater than 2 degrees, and said deviation from normal being no less than 0.1 degrees.

13. The biocidal coating of claim 1, wherein said deviation from normal being no greater than 5 degrees.

* * * * *